(12) United States Patent
Matsuda et al.

(10) Patent No.: US 10,107,570 B2
(45) Date of Patent: Oct. 23, 2018

(54) STACKING-TYPE HEADER, HEAT EXCHANGER, AND AIR-CONDITIONING APPARATUS

(71) Applicant: Mitsubishi Electric Corporation, Tokyo (JP)

(72) Inventors: Takuya Matsuda, Tokyo (JP); Akira Ishibashi, Tokyo (JP); Takashi Okazaki, Tokyo (JP); Shigeyoshi Matsui, Tokyo (JP); Shinya Higashiiue, Tokyo (JP); Daisuke Ito, Tokyo (JP); Atsushi Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 121 days.

(21) Appl. No.: 14/785,705

(22) PCT Filed: May 15, 2013

(86) PCT No.: PCT/JP2013/063601
§ 371 (c)(1),
(2) Date: Oct. 20, 2015

(87) PCT Pub. No.: WO2014/184912
PCT Pub. Date: Nov. 20, 2014

(65) Prior Publication Data
US 2016/0076825 A1    Mar. 17, 2016

(51) Int. Cl.
*F28F 9/02*     (2006.01)
*F16L 41/02*    (2006.01)
(Continued)

(52) U.S. Cl.
CPC ............ *F28F 9/0278* (2013.01); *F16L 41/02* (2013.01); *F28D 1/05316* (2013.01);
(Continued)

(58) Field of Classification Search
CPC .......... F28F 9/0278; F28F 3/12; F28F 9/0265; F28F 9/06; F28F 3/08; F28F 1/0476;
(Continued)

(56) References Cited

U.S. PATENT DOCUMENTS 2,537,276 A  *  1/1951  McMahon  ............ F28F 3/086
                                          165/166
3,221,982 A  *  12/1965  Yampolsky  ............ F04D 25/04
                                          122/1 R
(Continued)

FOREIGN PATENT DOCUMENTS

| JP | 06-011291 A | 1/1994 |
| JP | 2000-161818 A | 6/2000 |
| JP | 2007-298197 A | 11/2007 |

OTHER PUBLICATIONS

Extended European Search Report dated Dec. 5, 2016 issued in corresponding EP patent application 13884669.6.
(Continued)

*Primary Examiner* — Len Tran
*Assistant Examiner* — Kamran Tavakoldavani
(74) *Attorney, Agent, or Firm* — Posz Law Group, PLC

(57) ABSTRACT

In a stacking-type header including a first plate-shaped unit and a second plate-shaped unit, a distribution flow passage in the second plate-shaped unit includes at least one branching flow passage, in which the second plate-shaped unit includes at least one plate-shaped member having a groove formed as a flow passage, the groove having at least one branching portion for branching one branch part into a plurality of branch parts, in which the at least one branching flow passage is formed by closing the groove in a region other than a refrigerant inflow region and a refrigerant outflow region, and in which at least part of the refrigerant branched by flowing into the at least one branching flow passage sequentially passes through the one branch part and
(Continued)

the plurality of branch parts, and flows out from the at least one branching flow passage through end portions of the groove.

12 Claims, 11 Drawing Sheets

(51) Int. Cl.
    *F28D 1/053*         (2006.01)
    *F28D 9/00*          (2006.01)
    *F28F 3/12*          (2006.01)

(52) U.S. Cl.
    CPC ....... *F28D 1/05366* (2013.01); *F28D 9/0093* (2013.01); *F28F 3/12* (2013.01)

(58) Field of Classification Search
    CPC ....... F28F 9/013; F16L 41/02; F28D 1/05316; F28D 1/05366; F28D 9/0093; F28D 1/0476; F28D 1/0477; F28D 9/02
    See application file for complete search history.

(56) References Cited

U.S. PATENT DOCUMENTS

| | | | | |
|---|---|---|---|---|
| 5,241,839 | A | | 9/1993 | Hughes |
| 5,242,016 | A | * | 9/1993 | Voss ...................... F25B 39/028 165/173 |
| 5,514,248 | A | * | 5/1996 | Okuda .................. F25B 39/022 159/28.6 |
| 6,047,769 | A | * | 4/2000 | Shimoya ............... F28D 1/0333 165/148 |
| 6,892,805 | B1 | | 5/2005 | Valensa |
| 2010/0018231 | A1 | * | 1/2010 | Haller ................... F28D 1/0535 62/238.6 |
| 2012/0031586 | A1 | * | 2/2012 | Sugimura ............... F25B 39/04 165/104.21 |

OTHER PUBLICATIONS

Office Action dated Nov. 3, 2016 issued in corresponding CN patent application No. 2013800765793 (and English translation).
International Search Report of the International Searching Authority dated Jul. 23, 2013 for the corresponding international application No. PCT/JP2013/063601 (and English translation).

* cited by examiner (a) (b)

(a) (b)

(a)  (b)

STACKING-TYPE HEADER, HEAT EXCHANGER, AND AIR-CONDITIONING APPARATUS

CROSS REFERENCE TO RELATED APPLICATION

This application is a U.S. national stage application of International Application No. PCT/JP2013/063601 filed on May 15, 2013, the disclosure of which is incorporated herein by reference.

The present invention relates to a stacking-type header, a heat exchanger, and an air-conditioning apparatus.

BACKGROUND ART

As a related-art stacking-type header, there is known a stacking-type header including a first plate-shaped unit having a plurality of outlet flow passages formed therein, and a second plate-shaped unit stacked on the first plate-shaped unit and having a distribution flow passage formed therein, for distributing refrigerant, which passes through an inlet flow passage to flow into the second plate-shaped unit, to the plurality of outlet flow passages formed in the first plate-shaped unit to cause the refrigerant to flow out from the second plate-shaped unit. The distribution flow passage includes a branching flow passage having a plurality of grooves in an entire peripheral direction extending perpendicular to a refrigerant inflow direction from a refrigerant inflow position. The refrigerant passing through the inlet flow passage to flow into the branching flow passage passes through the plurality of grooves to be branched into a plurality of flows, to thereby pass through the plurality of outlet flow passages formed in the first plate-shaped unit to flow out from the first plate-shaped unit (for example, see Patent Literature 1).

CITATION LIST

Patent Literature

Patent Literature 1: Japanese Unexamined Patent Application Publication No. 2000-161818 (paragraph [0012] to paragraph [0020], FIG. 1, FIG. 2)

SUMMARY OF INVENTION

Technical Problem

In such a stacking-type header, through reduction of the angular interval between the plurality of grooves, the number of paths (in other words, the number of heat transfer tubes) is increased. To prevent partition walls between the grooves from becoming too thin, it is necessary to increase a diameter of the inlet flow passage so that the grooves are arrange away from the center of the inlet flow passage. In other words, there is a problem in that the stacking-type header may be upsized in the entire peripheral direction perpendicular to the refrigerant inflow direction.

The present invention has been made in view of the above-mentioned problem, and has an object to provide a stacking-type header suppressed in upsize in an entire peripheral direction perpendicular to a refrigerant inflow direction. Further, the present invention has an object to provide a heat exchanger including such a stacking-type header. Further, the present invention has an object to provide an air-conditioning apparatus including such a heat exchanger.

Solution to Problem

According to one embodiment of the present invention, there is provided a stacking-type header, including: a first plate-shaped unit having a plurality of first outlet flow passages formed therein; and a second plate-shaped unit stacked on the first plate-shaped unit, the second plate-shaped unit having a distribution flow passage formed therein, the distribution flow passage being configured to distribute refrigerant, which passes through a first inlet flow passage to flow into the second plate-shaped unit, to the plurality of first outlet flow passages to cause the refrigerant to flow out from the second plate-shaped unit, in which the distribution flow passage includes at least one branching flow passage, in which the second plate-shaped unit includes at least one plate-shaped member having a groove formed as a flow passage, the groove having at least one branching portion for branching one branch part into a plurality of branch parts, in which the at least one branching flow passage is formed by closing the groove in a region other than a refrigerant inflow region and a refrigerant outflow region, and in which at least part of the refrigerant branched by flowing into the at least one branching flow passage sequentially passes through the one branch part and the plurality of branch parts, and flows out from the at least one branching flow passage through end portions of the groove.

Advantageous Effects of Invention

In the stacking-type header according to the one embodiment of the present invention, the distribution flow passage includes the at least one branching flow passage. The second plate-shaped unit includes the at least one plate-shaped member having the groove formed as the flow passage, the groove having the at least one branching portion for branching the one branch part into the plurality of branch parts. The at least one branching flow passage is formed by closing the groove in the region other than the refrigerant inflow region and the refrigerant outflow region. The at least part of the refrigerant branched by flowing into the at least one branching flow passage sequentially passes through the one branch part and the plurality of branch parts, and flows out from the at least one branching flow passage through the end portions of the groove. In the branching flow passage, the refrigerant branched at the refrigerant inflow position is further branched at the branching portion, and hence the number of branches at the refrigerant inflow position can be reduced, which suppresses the upsize of the stacking-type header in the entire peripheral direction perpendicular to the refrigerant inflow direction.

DESCRIPTION OF EMBODIMENTS

Figure 1:
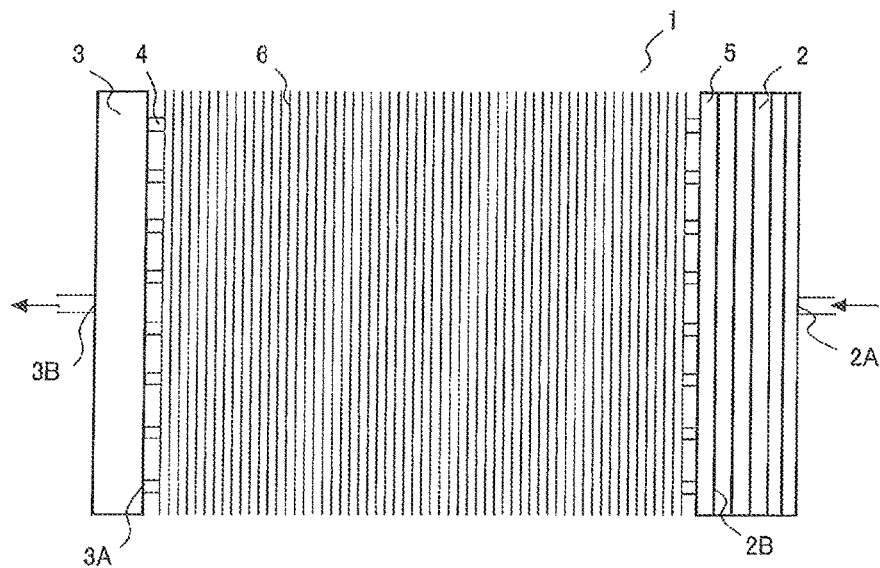
FIG. 1 is a view illustrating a configuration of a heat exchanger according to Embodiment 1.

Now, a stacking-type header according to the present invention is described with reference to the drawings.

Note that, in the following, there is described a case where the stacking-type header according to the present invention distributes refrigerant flowing into a heat exchanger, but the stacking-type header according to the present invention may distribute refrigerant flowing into other devices. Further, the configuration, operation, and other matters described below are merely examples, and the present invention is not limited to such configuration, operation, and other matters. Further, in the drawings, the same or similar components are denoted by the same reference symbols, or the reference symbols therefor are omitted. Further, the illustration of details in the structure is appropriately simplified or omitted. Further, overlapping description or similar description is appropriately simplified or omitted.

Embodiment 1

A heat exchanger according to Embodiment 1 is described.

Configuration of Heat Exchanger

Now, the configuration of the heat exchanger according to Embodiment 1 is described.

FIG. 1 is a view illustrating the configuration of the heat exchanger according to Embodiment 1.

As illustrated in FIG. 1, a heat exchanger 1 includes a stacking-type header 2, a header 3, a plurality of first heat transfer tubes 4, a retaining member 5, and a plurality of fins 6.

The stacking-type header 2 includes a refrigerant inflow port 2A and a plurality of refrigerant outflow ports 2B. The header 3 includes a plurality of refrigerant inflow ports 3A and a refrigerant outflow port 3B. Refrigerant pipes are connected to the refrigerant inflow port 2A of the stacking-type header 2 and the refrigerant outflow port 3B of the header 3. The plurality of first heat transfer tubes 4 are connected between the plurality of refrigerant outflow ports 2B of the stacking-type header 2 and the plurality of refrigerant inflow ports 3A of the header 3.

The first heat transfer tube 4 is a flat tube having a plurality of flow passages formed therein. The first heat transfer tube 4 is made of, for example, aluminum. End portions of the plurality of first heat transfer tubes 4 on the stacking-type header 2 side are connected to the plurality of refrigerant outflow ports 2B of the stacking-type header 2 under a state in which the end portions are retained by the plate-shaped retaining member 5. The retaining member 5 is made of, for example, aluminum. The plurality of fins 6 are joined to the first heat transfer tubes 4. The fin 6 is made of, for example, aluminum. It is preferred that the first heat transfer tubes 4 and the fins 6 be joined by brazing. Note that, in FIG. 1, there is illustrated a case where eight first heat transfer tubes 4 are provided, but the present invention is not limited to such a case.

Flow of Refrigerant in Heat Exchanger

Now, the flow of the refrigerant in the heat exchanger according to Embodiment 1 is described.

The refrigerant flowing through the refrigerant pipe passes through the refrigerant inflow port 2A to flow into the stacking-type header 2 to be distributed, and then passes through the plurality of refrigerant outflow ports 2B to flow out toward the plurality of first heat transfer tubes 4. In the plurality of first heat transfer tubes 4, the refrigerant exchanges heat with air supplied by a fan, for example. The refrigerant flowing through the plurality of first heat transfer tubes 4 passes through the plurality of refrigerant inflow ports 3A to flow into the header 3 to be joined, and then passes through the refrigerant outflow port 3B to flow out toward the refrigerant pipe. The refrigerant can reversely flow.

Configuration of Laminated Header

Now, the configuration of the stacking-type header of the heat exchanger according to Embodiment 1 is described.

Figure 2:
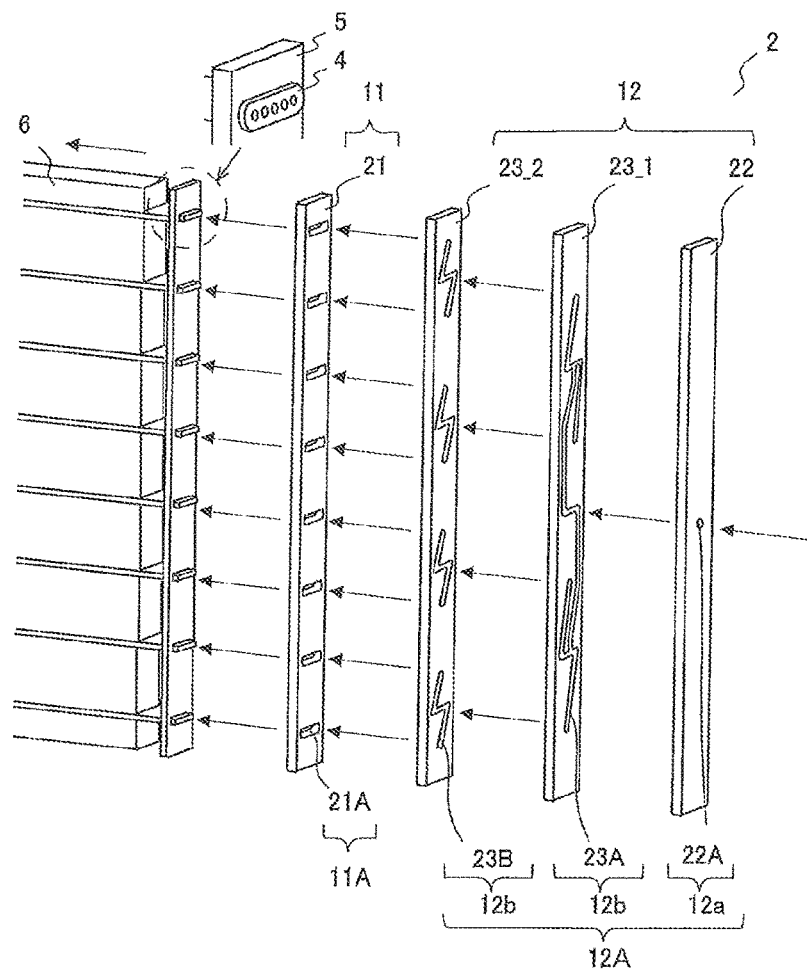
FIG. 2 is a perspective view illustrating the heat exchanger according to Embodiment 1 under a state in which a stacking-type header is disassembled.

FIG. 2 is a perspective view of the heat exchanger according to Embodiment 1 under a state in which the stacking-type header is disassembled.

As illustrated in FIG. 2, the stacking-type header 2 includes a first plate-shaped unit 11 and a second plate-shaped unit 12. The first plate-shaped unit 11 and the second plate-shaped unit 12 are stacked on each other.

The first plate-shaped unit 11 is stacked on the refrigerant outflow side. The first plate-shaped unit 11 includes a first plate-shaped member 21. The first plate-shaped unit 11 has a plurality of first outlet flow passages 11A formed therein. The plurality of first outlet flow passages 11A correspond to the plurality of refrigerant outflow ports 2B in FIG. 1.

The first plate-shaped member 21 has a plurality of flow passages 21A formed therein. The plurality of flow passages 21A are each a through hole having an inner peripheral surface shaped conforming to an outer peripheral surface of the first heat transfer tube 4. When the first plate-shaped member 21 is stacked, the plurality of flow passages 21A function as the plurality of first outlet flow passages 11A. The first plate-shaped member 21 has a thickness of about 1 mm to 10 mm, and is made of aluminum, for example. When the plurality of flow passages 21A are formed by press working or other processing, the work is simplified, and the manufacturing cost is reduced.

The end portions of the first heat transfer tubes 4 are projected from the surface of the retaining member 5. When the first plate-shaped unit 11 is stacked on the retaining member 5 so that the inner peripheral surfaces of the first outlet flow passages 11A are fitted to the outer peripheral surfaces of the respective end portions of the first heat transfer tubes 4, the first heat transfer tubes 4 are connected to the first outlet flow passages 11A. The first outlet flow passages 11A and the first heat transfer tubes 4 may be positioned through, for example, fitting between a convex portion formed in the retaining member 5 and a concave portion formed in the first plate-shaped unit 11. In such a case, the end portions of the first heat transfer tubes 4 may not be projected from the surface of the retaining member 5. The retaining member 5 may be omitted so that the first heat transfer tubes 4 are directly connected to the first outlet flow passages 11A. In such a case, the component cost and the like are reduced.

The second plate-shaped unit 12 is stacked on the refrigerant inflow side. The second plate-shaped unit 12 includes a second plate-shaped member 22 and a plurality of third plate-shaped members 23_1 and 23_2. The second plate-shaped unit 12 has a distribution flow passage 12A formed therein. The distribution flow passage 12A includes a first inlet flow passage 12a and a plurality of branching flow passages 12b. The first inlet flow passage 12a corresponds to the refrigerant inflow port 2A in FIG. 1.

The second plate-shaped member 22 has a flow passage 22A formed therein. The flow passage 22A is a circular through hole. When the second plate-shaped member 22 is stacked, the flow passage 22A functions as the first inlet flow passage 12a. The second plate-shaped member 22 has a thickness of about 1 mm to 10 mm, and is made of aluminum, for example. When the flow passage 22A is formed by press working or other processing, the work is simplified, and the manufacturing cost and the like are reduced.

For example, a fitting or other such component is provided on the surface of the second plate-shaped member 22 on the refrigerant inflow side, and the refrigerant pipe is connected to the first inlet flow passage 12a through the fitting or other such component. The inner peripheral surface of the first inlet flow passage 12a may be shaped to be fitted to the outer peripheral surface of the refrigerant pipe so that the refrigerant pipe may be directly connected to the first inlet flow passage 12a without using the fitting or other such component. In such a case, the component cost and the like are reduced.

The third plate-shaped member 23_1 has a flow passage 23A formed therein. The third plate-shaped member 23_2 has a plurality of flow passages 23B formed therein. The flow passages 23A and 23B are each a through groove. The shape of the through groove is described in detail later. When the plurality of third plate-shaped members 23_1 and 23_2 are stacked, each of the flow passages 23A and 23B functions as the branching flow passage 12b. The plurality of third plate-shaped members 23_1 and 23_2 each have a thickness of about 1 mm to 10 mm, and are made of aluminum, for example. When the flow passages 23A and 23B are formed by press working or other processing, the work is simplified, and the manufacturing cost and the like are reduced.

In the following, in some cases, the plurality of third plate-shaped members 23_1 and 23_2 are collectively referred to as the third plate-shaped member 23. In the following, in some cases, the retaining member 5, the first plate-shaped member 21, the second plate-shaped member 22, and the third plate-shaped member 23 are collectively referred to as the plate-shaped member.

The branching flow passage 12b formed by the flow passage 23A branches the refrigerant flowing therein into four flows to cause the refrigerant to flow out therefrom through end portions of the groove. The branching flow passage 12b formed by the flow passage 23B branches the refrigerant flowing therein into two flows to cause the refrigerant to flow out therefrom through end portions of the groove. Therefore, when the number of the first heat transfer tubes 4 to be connected is eight, two third plate-shaped members 23 are required. When the number of the first heat transfer tubes 4 to be connected is sixteen, two third plate-shaped members 23 each having the flow passages 23A formed therein are required. There may be provided a single third plate-shaped member 23 having the flow passage 23A formed therein and two third plate-shaped members 23 each having the flow passages 23B formed therein. The number of the first heat transfer tubes 4 to be connected is not limited to powers of 2. In such a case, the branching flow passage 12b and a non-branching flow passage may be combined with each other. Note that, there may be provided four first heat transfer tubes 4 to be connected and a single third plate-shaped member 23 having the flow passage 23A formed therein. Further, the lamination order of the third plate-shaped member 23_1 and the third plate-shaped member 23_2 may be reversed. In such a case, for example, a single flow passage 23B may be formed in the third plate-shaped member 23_2, and two flow passages 23A may be formed in the third plate-shaped member 23_1.

Figure 3:
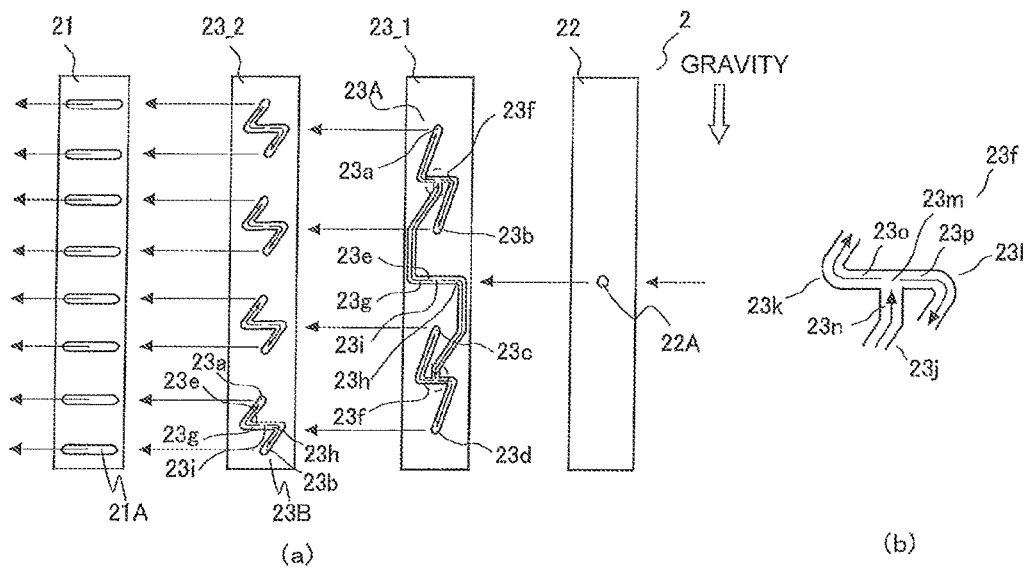
FIG. 3 are a developed view of the stacking-type header of the heat exchanger according to Embodiment 1.

FIG. 3 are a developed view of the stacking-type header of the heat exchanger according to Embodiment 1. Note that, FIG. 3(b) is a detailed view of a branching portion 23f.

As illustrated in FIG. 3(a), the flow passage 23A formed in the third plate-shaped member 23 has a shape in which an end portion 23a, an end portion 23b, an end portion 23c, and an end portion 23d are connected to each other through a straight-line part 23e and two branching portions 23f. The straight-line part 23e is perpendicular to the gravity direction. The branching flow passage 12b is formed by closing, by a member stacked adjacent on the refrigerant inflow side, the flow passage 23A in a region other than a partial region 23i (hereinafter referred to as "opening port 23i") between an end portion 23g and an end portion 23h of the straight-line part 23e, and closing, by a member stacked adjacent on the refrigerant outflow side, a region other than the end portions 23a to 23d.

In order to cause the refrigerant, which flows into the opening port 23i and is branched thereat, and is further branched at the branching portions 23f, to flow out from the flow passage 23A at different heights, the end portions 23a to 23d are positioned at heights different from one another. In particular, when one of the branching portions 23f is positioned on the upper side relative to the straight-line part 23e, and the other thereof is positioned on the lower side relative to the straight-line part 23e, each distance from the opening port 23i along the flow passage 23A to each of the end portions 23a to 23d can be less biased without complicating the shape. Further, when each of the end portion 23a and the end portion 23c is positioned on the upper side relative to the branching portion 23f, and each of the end portion 23b and the end portion 23d is positioned on the lower side relative to the branching portion 23f, each distance from the opening port 23i along the flow passage 23A to each of the end portions 23a to 23d can be less biased without complicating the shape. When the array direction of the end portions 23a to 23d is set parallel to the longitudinal direction of the third plate-shaped member 23, the dimension of the third plate-shaped member 23 in the transverse direction can be decreased, which reduces the component cost, the weight, and the like. Further, when the array direction of the end portions 23a to 23d is set parallel to the array direction of the first heat transfer tubes 4, space saving can be achieved in the heat exchanger 1.

The flow passage 23B formed in the third plate-shaped member 23 is similar to the flow passage 23A formed in the third plate-shaped member 23 except that the flow passage 23B includes the two end portions 23a and 23b, and does not include the branching portions 23f. In other words, the branching flow passage 12b is formed by closing, by a member stacked adjacent on the refrigerant inflow side, the flow passage 23B in a region other than the opening port 23i, and closing, by a member stacked adjacent on the refrigerant outflow side, the flow passage 23B in a region other than the end portions 23a and 23b. The branching flow passage 12b may be formed by a flow passage 23B having a different shape.

As illustrated in FIG. 3(b), the branching portion 23f braches a branch part 23j into branch parts 23k and 23l. The branch part 23j communicates with the opening port 23i. The branch part 23k communicates with each of the end portions 23a and 23c, and the branch part 23l communicates with each of the end portions 23b and 23d. The branch part 23j extends straight toward a center 23m of the branching portion in a direction parallel to the gravity direction. A part ranging from the center 23m of the branching portion to an end portion of a straight-line part of the branching portion is defined as a straight-line part 23n. The branch parts 23k and 23l extend straight from the center 23m of the branching portion in directions opposite to each other and perpendicular to the gravity direction. Parts ranging from the center 23m of the branching portion to end portions of straight line parts are defined as straight-line parts 23o and 23p, respectively.

Figure 4:
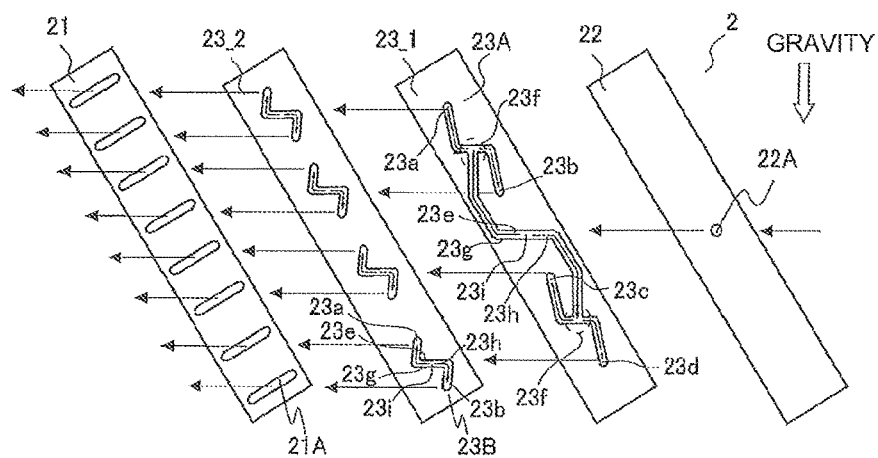
FIG. 4 is a developed view of the stacking-type header of the heat exchanger according to Embodiment 1.

FIG. 4 is a developed view of the stacking-type header of the heat exchanger according to Embodiment 1.

As illustrated in FIG. 4, when the array direction of the first heat transfer tubes 4 is not parallel to the gravity direction, in other words, when the array direction intersects with the gravity direction, the straight-line part 23e is not perpendicular to the longitudinal direction of the third plate-shaped member 23. In other words, the stacking-type header 2 is not limited to a stacking-type header in which the plurality of first outlet flow passages 11A are arrayed along the gravity direction, and may be used in a case where the heat exchanger 1 is installed in an inclined manner, such as a heat exchanger for a wall-mounting type room air-conditioning apparatus indoor unit, an outdoor unit for an air-conditioning apparatus, or a chiller outdoor unit. Note that, in FIG. 4, there is illustrated a case where the longitudinal direction of the cross section of the flow passage 21A formed in the first plate-shaped member 21, in other words, the longitudinal direction of the cross section of the first outlet flow passage 11A is perpendicular to the longitudinal direction of the first plate-shaped member 21, but the longitudinal direction of the cross section of the first outlet flow passage 11A may be perpendicular to the gravity direction.

The flow passage 23A may not include the straight-line part 23e. In such a case, a horizontal part of the flow passage 23A, which is perpendicular to the gravity direction and positioned between a lower end of the upper branching portion 23f and an upper end of the lower branching portion 23f, serves as the opening port 23i. In a case where the flow passage 23A includes the straight-line part 23e, when the refrigerant is branched at the opening port 23i, the angles of the respective branching directions with respect to the gravity direction are uniform, which reduces the influence of the gravity.

Figure 5:
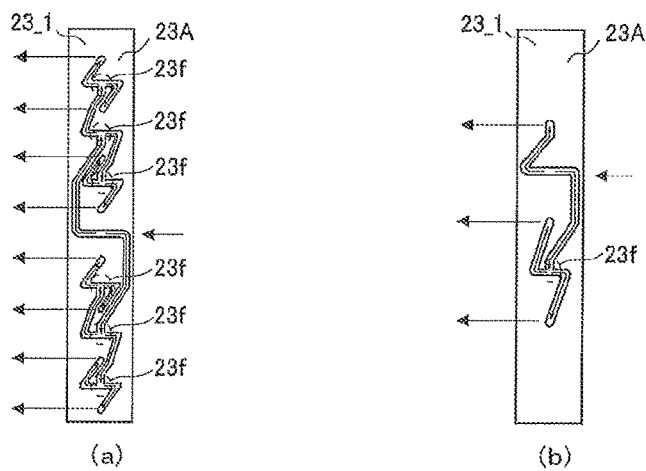
FIG. 5 are views each illustrating a modified example of a flow passage formed in a third plate-shaped member of the heat exchanger according to Embodiment 1.

FIG. 5 are views each illustrating a modified example of the flow passage formed in the third plate-shaped member of the heat exchanger according to Embodiment 1.

As illustrated in FIG. 5(a), the flow passage 23A may include eight end portions and six branching portions 23f. In such a case, a single branching flow passage 12b can branch the refrigerant flowing therein into eight flows, and hence the number of the third plate-shaped members 23 can be reduced. Further, the frequency of occurrence of brazing failure can be reduced. In other words, the number of the branching portions 23f of the flow passage 23A is not necessarily two. Through the changing of the number of the branching portions 23f, the number of the branches for the refrigerant flowing therein may be changed freely.

As illustrated in FIG. 5(b), the flow passage 23A may include three end portions and a single branching portion 23f. For example, such a configuration is effective when the number of the first heat transfer tubes 4 to be connected is not powers of 2. In such a case, a flow-passage resistance in a passing region for the refrigerant flowing out from an end portion of the flow passage 23A without passing through the branching portion 23f of the flow passage 23A may be increased to equalize flow rates of the refrigerant flowing out from the three end portions. When the shape of the flow passage (such as width of the flow passage, length of the flow passage, bending of the flow passage, and surface roughness of the flow passage) is optimized, the flow-passage resistance can be increased.

Flow of Refrigerant in Laminated Header

Now, the flow of the refrigerant in the stacking-type header of the heat exchanger according to Embodiment 1 is described.

As illustrated in FIG. 3 and FIG. 4, the refrigerant passing through the flow passage 22A of the second plate-shaped member 22 flows into the opening port 23$i$ of the flow passage 23A formed in the third plate-shaped member 23_1. The refrigerant flowing into the opening port 23$f$ hits against the surface of the member stacked adjacent to the third plate-shaped member 23_1, and is branched into two flows respectively toward the end portion 23$g$ and the end portion 23$h$ of the straight-line part 23$e$. The branched refrigerant sequentially passes through the branch part 23$j$ of the branching portion 23$f$ and each of the branch parts 23$k$ and 23$l$ to reach each of the end portions 23$a$ to 23$d$ of the flow passage 23A and flows into the opening port 23$i$ of the flow passage 23B formed in the third plate-shaped member 23_2.

The refrigerant flowing into the opening port 23$i$ of the flow passage 23B formed in the third plate-shaped member 23_2 hits against the surface of the member stacked adjacent to the third plate-shaped member 23_2, and is branched into two flows respectively toward the end portion 23$g$ and the end portion 23$h$ of the straight-line part 23$e$. The branched refrigerant reaches each of the end portions 23$a$ and 23$b$ of the flow passage 23B, and passes through the flow passage 21A of the first plate-shaped member 21 to flow into the first heat transfer tube 4.

Method of Laminating Plate-like Members

Now, a method of stacking the respective plate-shaped members of the stacking-type header of the heat exchanger according to Embodiment 1 is described.

The respective plate-shaped members may be stacked by brazing. A both-side clad member having a brazing material rolled on both surfaces thereof may be used for all of the plate-shaped members or alternate plate-shaped members to supply the brazing material for joining. A one-side clad member having a brazing material rolled on one surface thereof may be used for all of the plate-shaped members to supply the brazing material for joining. A brazing-material sheet may be stacked between the respective plate-shaped members to supply the brazing material. A paste brazing material may be applied between the respective plate-shaped members to supply the brazing material. A both-side clad member having a brazing material rolled on both surfaces thereof may be stacked between the respective plate-shaped members to supply the brazing material.

Through lamination with use of brazing, the plate-shaped members are stacked without a gap therebetween, which suppresses leakage of the refrigerant and further secures the pressure resistance. When the plate-shaped members are pressurized during brazing, the occurrence of brazing failure is further suppressed. When processing that promotes formation of a fillet, such as forming a rib at a position at which leakage of the refrigerant is liable to occur, is performed, the occurrence of brazing failure is further suppressed.

Further, when all of the members to be subjected to brazing, including the first heat transfer tube 4 and the fin 6, are made of the same material (for example, made of aluminum), the members may be collectively subjected to brazing, which improves the productivity. After the brazing in the stacking-type header 2 is performed, the brazing of the first heat transfer tube 4 and the fin 6 may be performed. Further, only the first plate-shaped unit 11 may be first joined to the retaining member 5 by brazing, and the second plate-shaped unit 12 may be joined by brazing thereafter.

Figure 6:
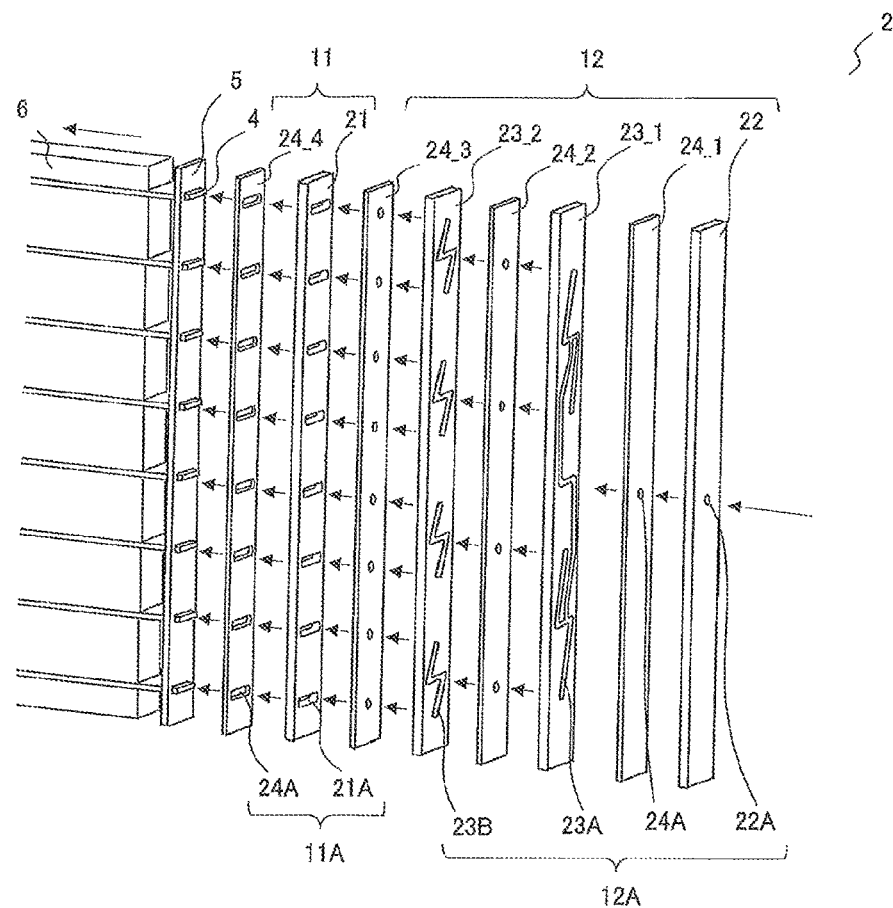
FIG. 6 is a perspective view illustrating the heat exchanger according to Embodiment 1 under a state in which the stacking-type header is disassembled.
Figure 7:
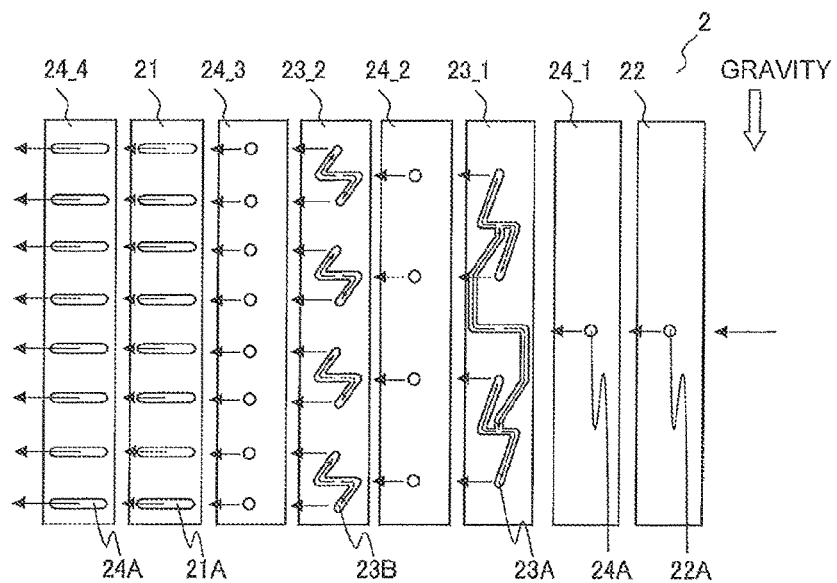
FIG. 7 is a developed view of the stacking-type header of the heat exchanger according to Embodiment 1.

FIG. 6 is a perspective view of the heat exchanger according to Embodiment 1 under a state in which the stacking-type header is disassembled. FIG. 7 is a developed view of the stacking-type header of the heat exchanger according to Embodiment 1.

In particular, a plate-shaped member having a brazing material rolled on both surfaces thereof, in other words, a both-side clad member may be stacked between the respective plate-shaped members to supply the brazing material. As illustrated in FIG. 6 and FIG. 7, a plurality of both-side clad members 24_1 to 24_4 are stacked between the respective plate-shaped members. In the following, in some cases, the plurality of both-side clad members 24_1 to 24_4 are collectively referred to as the both-side clad member 24. Note that, the both-side clad member 24 may be stacked between a part of the plate-shaped members, and a brazing material may be supplied between the remaining plate-shaped members by other methods.

The both-side clad member 24 has a flow passage 24A, which passes through the both-side clad member 24, formed in a region that is opposed to a refrigerant outflow region of the flow passage formed in the plate-shaped member stacked adjacent on the refrigerant inflow side. The flow passage 24A formed in the both-side clad member 24 stacked between the second plate-shaped member 22 and the third plate-shaped member 23 is a circular through hole. The flow passage 24A formed in the both-side clad member 24_4 stacked between the first plate-shaped member 21 and the retaining member 5 is a through hole having an inner peripheral surface shaped conforming to the outer peripheral surface of the first heat transfer tube 4.

When the both-side clad member 24 is stacked, the flow passage 24A functions as a refrigerant partitioning flow passage for the first outlet flow passage 11A and the distribution flow passage 12A. Under a state in which the both-side clad member 24_4 is stacked on the retaining member 5, the end portions of the first heat transfer tubes 4 may be or not be projected from the surface of the both-side clad member 24_4. When the flow passage 24A is formed by press working or other processing, the work is simplified, and the manufacturing cost and the like are reduced. When all of the members to be subjected to brazing, including the both-side clad member 24, are made of the same material (for example, made of aluminum), the members may be collectively subjected to brazing, which improves the productivity.

Through formation of the refrigerant partitioning flow passage by the both-side clad member 24, in particular, the branched flows of refrigerant flowing out from the branching flow passage 12$b$ can be reliably partitioned from each other. Further, by the amount of the thickness of each both-side clad member 24, an entrance length for the refrigerant flowing into the branching flow passage 12$b$ or the first outlet flow passage 11A can be secured, which improves the uniformity in distribution of the refrigerant. Further, the flows of the refrigerant can be reliably partitioned from each other, and hence the degree of freedom in design of the branching flow passage 12$b$ can be increased.

Shape of Flow Passage of Third Plate-Like Member

Now, the flow passage formed in the third plate-shaped member of the stacking-type header of the heat exchanger according to Embodiment 1 is described in detail.

Note that, the description below is directed to a case where the branch part 23*j* extends from below toward the center 23*m* of the branching portion, the branch part 23*k* extends upward from the center 23*m* of the branching portion, and the branch part 23*l* extends downward from the center 23*m* of the branching portion. The same applies also to other cases.

Figure 8:
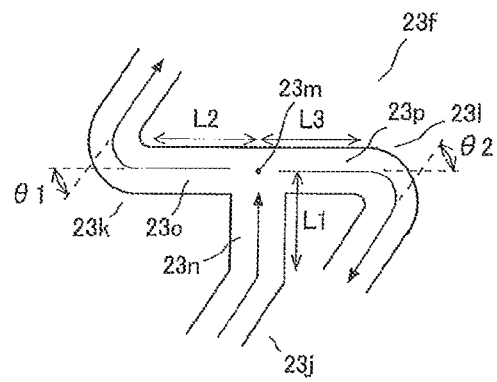
FIG. 8 is a view illustrating a branching portion of the flow passage formed in the third plate-shaped member of the heat exchanger according to Embodiment 1.

FIG. 8 is a view illustrating the branching portion of the flow passage formed in the third plate-shaped member of the heat exchanger according to Embodiment 1.

As illustrated in FIG. 8, a distance of the straight-line part 23*n* of the branch part 23*j* is defined as a straight-line distance L1. Further, a hydraulic equivalent diameter of the straight-line part 23*n* is defined as a hydraulic equivalent diameter De1, and a ratio of the straight-line distance L1 to the hydraulic equivalent diameter De1 is defined as a straight-line ratio L1/De1. A ratio of a flow rate of the refrigerant flowing out from the branch part 23*k* to a sum of a flow rate of the refrigerant flowing out from the branch part 23*k* and a flow rate of the refrigerant flowing out from the branch part 23*l* is defined as a distribution ratio R.

Figure 9:
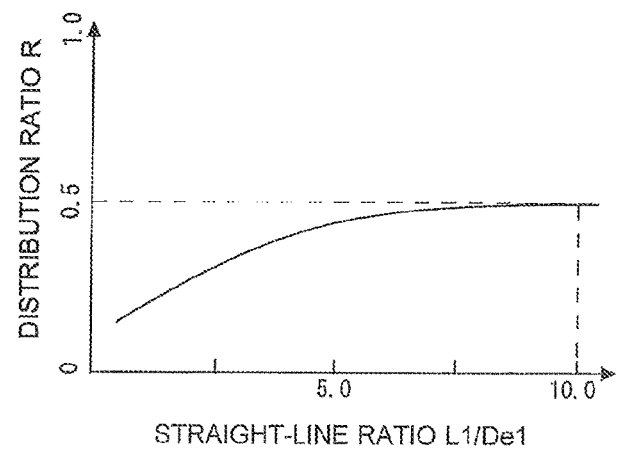
FIG. 9 is a graph showing a relationship between a straight-line ratio and a distribution ratio in the branching portion in the flow passage formed in the third plate-shaped member of the heat exchanger according to Embodiment 1.

FIG. 9 is a graph showing a relationship between the straight-line ratio and the distribution ratio in the branching portion of the flow passage formed in the third plate-shaped member of the heat exchanger according to Embodiment 1. Note that, FIG. 9 shows a change in distribution ratio R when the straight-line ratio L1/De1 is changed.

As shown in FIG. 9, the distribution ratio R is changed so that the distribution ratio R is increased until the straight-line ratio L1/De1 reaches 10.0, and the distribution ratio R reaches 0.5 when the straight-line ratio L1/De1 is 10.0 or more. When the straight-line ratio L1/De1 is less than 10.0, because a region between the straight-line part 23*e* and the straight-line part 23*n* of the flow passage 23A is not parallel to the gravity direction, the refrigerant flows into the center 23*m* of the branching portion in a state of causing drift, and hence the distribution ratio R does not reach 0.5.

Figure 10:
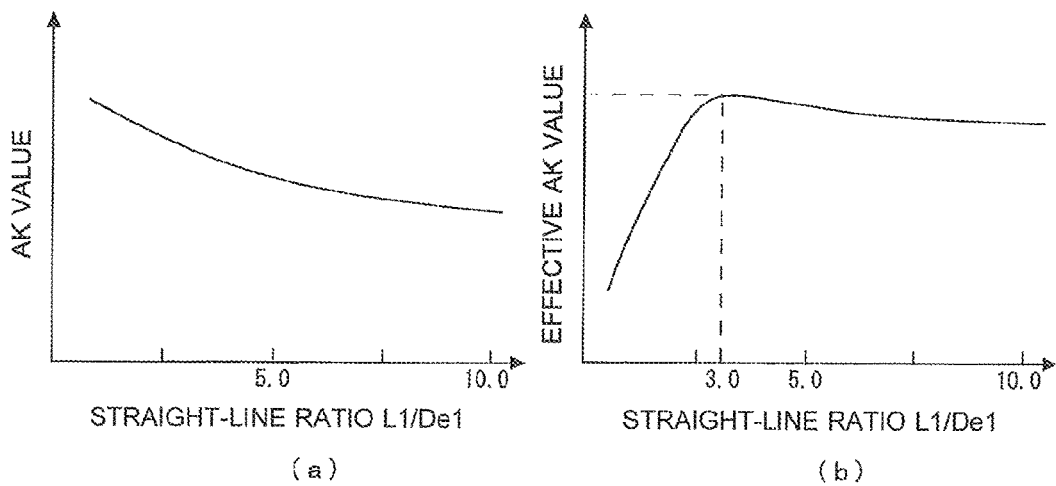
FIG. 10 are graphs each showing a relationship between the straight-line ratio and an AK value of the heat exchanger in the branching portion of the flow passage formed in the third plate-shaped member of the heat exchanger according to Embodiment 1.

FIG. 10 are graphs each showing a relationship between the straight-line ratio and an AK value of the heat exchanger in the branching portion of the flow passage formed in the third plate-shaped member of the heat exchanger according to Embodiment 1. Note that, FIG. 10(*a*) shows a change in AK value of the heat exchanger 1 when the straight-line ratio L1/De1 is changed. FIG. 10(*b*) shows a change in effective AK value of the heat exchanger 1 when the straight-line ratio L1/De1 is changed. The AK value is a multiplication value of a heat transfer area A [m$^2$] of the heat exchanger 1 and an overall heat transfer coefficient K [J/(S·m$^2$·K)] of the heat exchanger 1, and the effective AK value is a value defined based on a multiplication value of the AK value and the above-mentioned distribution ratio R. As the effective AK value is higher, the performance of the heat exchanger 1 is enhanced.

On the other hand, as shown in FIG. 10(*a*), as the straight-line ratio L1/De1 is higher, an array interval of the first heat transfer tubes 4 is increased, in other words, the number of the first heat transfer tubes 4 is reduced, and thus the AK value of the heat exchanger 1 is reduced. Therefore, as shown in FIG. 10(*b*), the effective AK value is changed so that the effective AK value is increased until the straight-line ratio L1/De1 reaches 3.0, and the effective AK is decreased while reducing a decreasing amount when the straight-line ratio L1/De1 is 3.0 or more. That is, when the straight-line ratio L1/De1 is set to 3.0 or more, the effective AK value, in other words, the performance of the heat exchanger 1 can be maintained.

As illustrated in FIG. 8, a distance of the straight-line part 23*o* of the branch part 23*k* is defined as a straight-line distance L2. A distance of the straight-line part 23*p* of the branch part 23*l* is defined as a straight-line distance L3. A hydraulic equivalent diameter of the branch part 23*k* is defined as a hydraulic equivalent diameter De2, and a ratio of the straight-line distance L2 to the hydraulic equivalent diameter De2 is defined as a straight-line ratio L2/De2. A hydraulic equivalent diameter of the branch part 23*l* is defined as a hydraulic equivalent diameter De3, and a ratio of the straight-line distance L3 to the hydraulic equivalent diameter De3 is defined as a straight-line ratio L3/De3.

Figure 11:
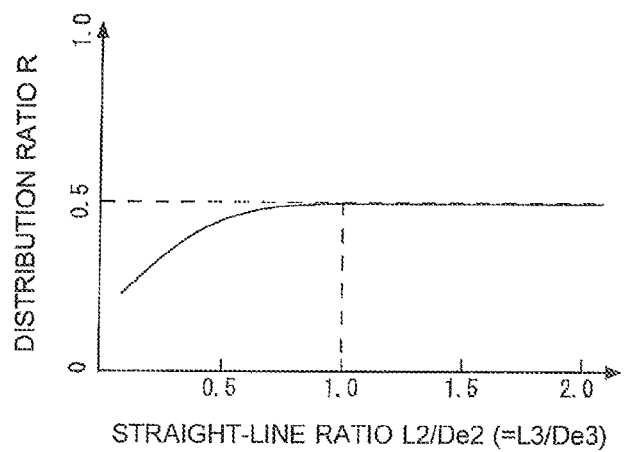
FIG. 11 is a graph showing a relationship between the straight-line ratio and the distribution ratio in the branching portion in the flow passage formed in the third plate-shaped member of the heat exchanger according to Embodiment 1.

FIG. 11 is a graph showing a relationship between the straight-line ratio and the distribution ratio in the branching portion of the flow passage formed in the third plate-shaped member of the heat exchanger according to Embodiment 1. Note that, FIG. 11 shows a change in distribution ratio R when the straight-line ratio L2/De2 (=L3/De3) is changed under a state in which the straight-line ratio L2/De2 is set equal to the straight-line ratio L3/De3.

As shown in FIG. 11, the distribution ratio R is changed so that the distribution ratio R is increased until the straight-line ratio L2/De2 and the straight-line ratio L3/De3 reach 1.0, and the distribution ratio R reaches 0.5 when the straight-line ratio L2/De2 and the straight-line ratio L3/De3 are 1.0 or more. When the straight-line ratio L2/De2 and the straight-line ratio L3/De3 are less than 1.0, the distribution ratio R does not become 0.5 because the branch part 23*k* and the branch part 23*l* are bent in different directions from the gravity direction. That is, when the straight-line ratio L2/De2 and the straight-line ratio L3/De3 are set to 1.0 or more, the uniformity in distribution of the refrigerant can be further improved.

As illustrated in FIG. 8, a bending angle of the branch part 23*k* is defined as an angle θ1, and a bending angle of the branch part 23*l* is defined as an angle θ2.

Figure 12:
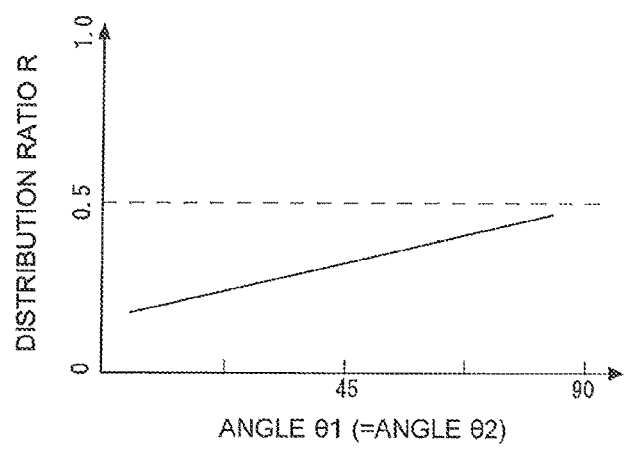
FIG. 12 is a graph showing a relationship between a bending angle and the distribution ratio in the branching portion of the flow passage formed in the third plate-shaped member of the heat exchanger according to Embodiment 1.

FIG. 12 is a graph showing a relationship between the bending angle and the distribution ratio in the branching portion of the flow passage formed in the third plate-shaped member of the heat exchanger according to Embodiment 1. Note that, FIG. 12 shows a change in distribution ratio R when the angle θ1 (=angleθ2) is changed under a state in which the angle θ1 is set equal to the angle θ2.

As shown in FIG. 12, as the angle θ1 and the angle θ2 approach 90 degrees, the distribution ratio R approaches 0.5. That is, when the angle θ1 and the angle θ2 are increased, the uniformity in distribution of the refrigerant can be further improved.

Usage Mode of Heat Exchanger

Now, an example of a usage mode of the heat exchanger according to Embodiment 1 is described.

Note that, in the following, there is described a case where the heat exchanger according to Embodiment 1 is used for an air-conditioning apparatus, but the present invention is not limited to such a case, and for example, the heat exchanger according to Embodiment 1 may be used for other refrigeration cycle apparatus including a refrigerant circuit. Further, there is described a case where the air-conditioning apparatus switches between a cooling operation and a heating operation, but the present invention is not limited to such a case, and the air-conditioning apparatus may perform only the cooling operation or the heating operation.

Figure 13:
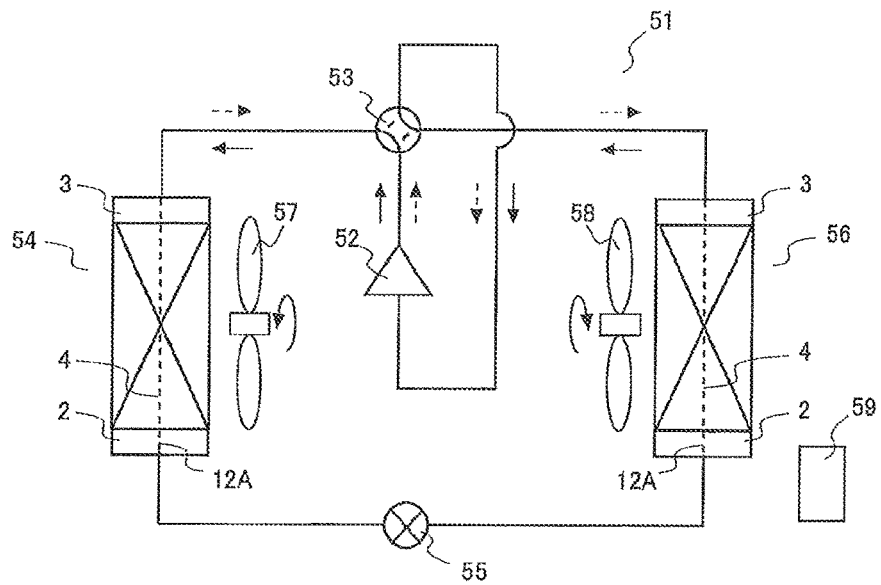
FIG. 13 is a diagram illustrating a configuration of an air-conditioning apparatus to which the heat exchanger according to Embodiment 1 is applied.

FIG. 13 is a view illustrating the configuration of the air-conditioning apparatus to which the heat exchanger according to Embodiment 1 is applied. Note that, in FIG. 13, the flow of the refrigerant during the cooling operation is indicated by the solid arrow, while the flow of the refrigerant during the heating operation is indicated by the dotted arrow.

As illustrated in FIG. 13, an air-conditioning apparatus 51 includes a compressor 52, a four-way valve 53, a heat source-side heat exchanger 54, an expansion device 55, a load-side heat exchanger 56, a heat source-side fan 57, a load-side fan 58, and a controller 59. The compressor 52, the four-way valve 53, the heat source-side heat exchanger 54, the expansion device 55, and the load-side heat exchanger 56 are connected by refrigerant pipes to form a refrigerant circuit.

The controller 59 is connected to, for example, the compressor 52, the four-way valve 53, the expansion device 55, the heat source-side fan 57, the load-side fan 58, and various sensors. The controller 59 switches the flow passage of the four-way valve 53 to switch between the cooling operation and the heating operation. The heat source-side heat exchanger 54 acts as a condensor during the cooling operation, and acts as an evaporator during the heating operation. The load-side heat exchanger 56 acts as the evaporator during the cooling operation, and acts as the condensor during the heating operation.

The flow of the refrigerant during the cooling operation is described.

The refrigerant in a high-pressure and high-temperature gas state discharged from the compressor 52 passes through the four-way valve 53 to flow into the heat source-side heat exchanger 54, and is condensed through heat exchange with the outside air supplied by the heat source-side fan 57, to thereby become the refrigerant in a high-pressure liquid state, which flows out from the heat source-side heat exchanger 54. The refrigerant in the high-pressure liquid state flowing out from the heat source-side heat exchanger 54 flows into the expansion device 55 to become the refrigerant in a low-pressure two-phase gas-liquid state. The refrigerant in the low-pressure two-phase gas-liquid state flowing out from the expansion device 55 flows into the load-side heat exchanger 56 to be evaporated through heat exchange with indoor air supplied by the load-side fan 58, to thereby become the refrigerant in a low-pressure gas state, which flows out from the load-side heat exchanger 56. The refrigerant in the low-pressure gas state flowing out from the load-side heat exchanger 56 passes through the four-way valve 53 to be sucked into the compressor 52.

The flow of the refrigerant during the heating operation is described.

The refrigerant in a high-pressure and high-temperature gas state discharged from the compressor 52 passes through the four-way valve 53 to flow into the load-side heat exchanger 56, and is condensed through heat exchange with the indoor air supplied by the load-side fan 58, to thereby become the refrigerant in a high-pressure liquid state, which flows out from the load-side heat exchanger 56. The refrigerant in the high-pressure liquid state flowing out from the load-side heat exchanger 56 flows into the expansion device 55 to become the refrigerant in a low-pressure two-phase gas-liquid state. The refrigerant in the low-pressure two-phase gas-liquid state flowing out from the expansion device 55 flows into the heat source-side heat exchanger 54 to be evaporated through heat exchange with the outside air supplied by the heat source-side fan 57, to thereby become the refrigerant in a low-pressure gas state, which flows out from the heat source-side heat exchanger 54. The refrigerant in the low-pressure gas state flowing out from the heat source-side heat exchanger 54 passes through the four-way valve 53 to be sucked into the compressor 52.

The heat exchanger 1 is used for at least one of the heat source-side heat exchanger 54 or the load-side heat exchanger 56. When the heat exchanger 1 acts as the evaporator, the heat exchanger 1 is connected so that the refrigerant flows in from the stacking-type header 2 and the refrigerant flows out from the header 3. In other words, when the heat exchanger 1 acts as the evaporator, the refrigerant in the two-phase gas-liquid state passes through the refrigerant pipe to flow into the stacking-type header 2, and the refrigerant in the gas state passes through the first heat transfer tube 4 to flow into the header 3. Further, when the heat exchanger 1 acts as the condensor, the refrigerant in the gas state passes through the refrigerant pipe to flow into the header 3, and the refrigerant in the liquid state passes through the first heat transfer tube 4 to flow into the stacking-type header 2.

Action of Heat Exchanger

Now, an action of the heat exchanger according to Embodiment 1 is described.

The second plate-shaped unit 12 of the stacking-type header 2 has the distribution flow passage 12A including the branching flow passages 12b formed therein. At least part of the refrigerant branched by flowing into the branching flow passage 12b sequentially passes through the branch part 23j and each of the branch parts 23k and 23l. In such a further branched state, the at least part of the refrigerant flows out from the branching flow passage 12b. In other words, the refrigerant branched at the opening port 23i is further branched at the branching portion 23f, and hence the number of branches at the opening port 23i can be reduced, which suppresses the upsize of the stacking-type header 2 in the entire peripheral direction perpendicular to the refrigerant inflow direction.

Further, in the stacking-type header 2, the refrigerant is branched in the branching portion 23f from the branch part 23j into the two branch parts 23k and 23l. Therefore, the distribution of the refrigerant is reliably uniformized. In particular, when all the opening port 23i and the branching portion 23f branch the refrigerant into two flows, the distribution of the refrigerant is further reliably uniformized.

Further, in the stacking-type header 2, the straight-line part 23o of the branch part 23k and the straight-line part 23p of the branch part 23l are positioned on the same straight line in the branching portion 23f. The straight-line part 23n of the branch part 23j and each of the straight-line parts 23o and 23p of the branch parts 23k and 23l perpendicularly intersect with each other. Therefore, the refrigerant, which flows into the center 23m from the branch part 23j, flows into each of the branch parts 23k and 23l without biasing angles for changing directions, which further improves the uniformity in distribution of the refrigerant.

Further, in the stacking-type header 2, the straight-line part 23n of the branch part 23j extends in parallel to the gravity direction, and the straight-line parts 23o and 23p of the branch parts 23k and 23l extend in a direction perpendicular to the gravity direction. Therefore, when the refrigerant branches at the center 23m of the branching portion, the action of the gravity in a biased manner is suppressed, which further improves the uniformity in distribution of the refrigerant.

Further, the flow passage 23A formed in the third plate-shaped member 23 is a through groove, and the branching flow passage 12b is formed by stacking the third plate-shaped member 23. Therefore, the processing and assembly are simplified, and the production efficiency, the manufacturing cost, and the like are reduced.

In particular, in the related-art stacking-type header, when the refrigerant flowing therein is in a two-phase gas-liquid state, the refrigerant is easily affected by the gravity, and it is difficult to equalize the flow rate and the quality of the refrigerant flowing into each heat transfer tube. In the stacking-type header 2, however, regardless of the flow rate and the quality of the refrigerant in the two-phase gas-liquid state flowing therein, the refrigerant is less liable to be affected by the gravity, and the flow rate and the quality of the refrigerant flowing into each first heat transfer tube 4 can be equalized.

In particular, in the related-art stacking-type header, when the heat transfer tube is changed from a circular tube to a flat tube for the purpose of reducing the refrigerant amount or achieving space saving in the heat exchanger, the stacking-type header is required to be upsized in the entire peripheral direction perpendicular to the refrigerant inflow direction. On the other hand, the stacking-type header 2 is not required to be upsized in the entire peripheral direction perpendicular to the refrigerant inflow direction, and thus space saving is achieved in the heat exchanger 1. In other words, in the related-art stacking-type header, when the heat transfer tube is changed from a circular tube to a flat tube, the sectional area of the flow passage in the heat transfer tube is reduced, and thus the pressure loss caused in the heat transfer tube is increased. Therefore, it is necessary to further reduce the angular interval between the plurality of grooves forming the branching flow passage to increase the number of paths (in other words, the number of heat transfer tubes), which causes upsize of the stacking-type header in the entire peripheral direction perpendicular to the refrigerant inflow direction. On the other hand, in the stacking-type header 2, even when the number of paths is required to be increased, the number of the branching portions 23f or the number of the third plate-shaped members 23 is only required to be increased, and hence the upsize of the stacking-type header 2 in the entire peripheral direction perpendicular to the refrigerant inflow direction is suppressed. Note that, the stacking-type header 2 is not limited to the case where the first heat transfer tube 4 is a flat tube.

Modified Example-1

Figure 14:
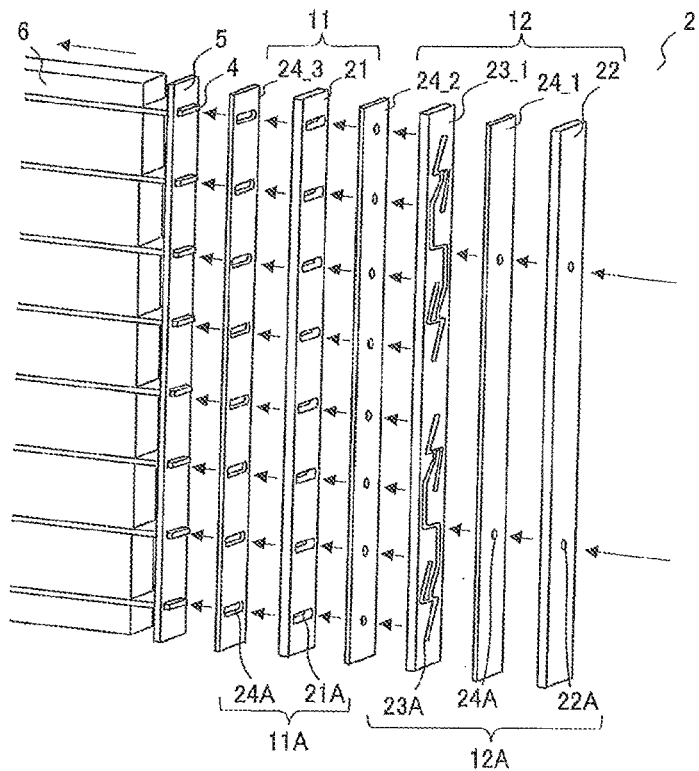
FIG. 14 is a perspective view of Modified Example-1 of the heat exchanger according to Embodiment 1 under a state in which the stacking-type header is disassembled.

FIG. 14 is a perspective view of Modified Example-1 of the heat exchanger according to Embodiment 1 under a state in which the stacking-type header is disassembled. Note that, in FIG. 14 and subsequent figures, a state in which the both-side clad member 24 is stacked is illustrated (state of FIG. 6 and FIG. 7), but it is needless to say that a state in which the both-side clad member 24 is not stacked (state of FIG. 2 and FIG. 3) may be employed.

As illustrated in FIG. 14, the second plate-shaped member 22 may have the plurality of flow passages 22A formed therein, in other words, the third plate-shaped member 23 may have the plurality of flow passages 23A formed therein, to thereby reduce the number of the third plate-shaped members 23. With such a configuration, the component cost, the weight, and the like can be reduced.

Figure 15:
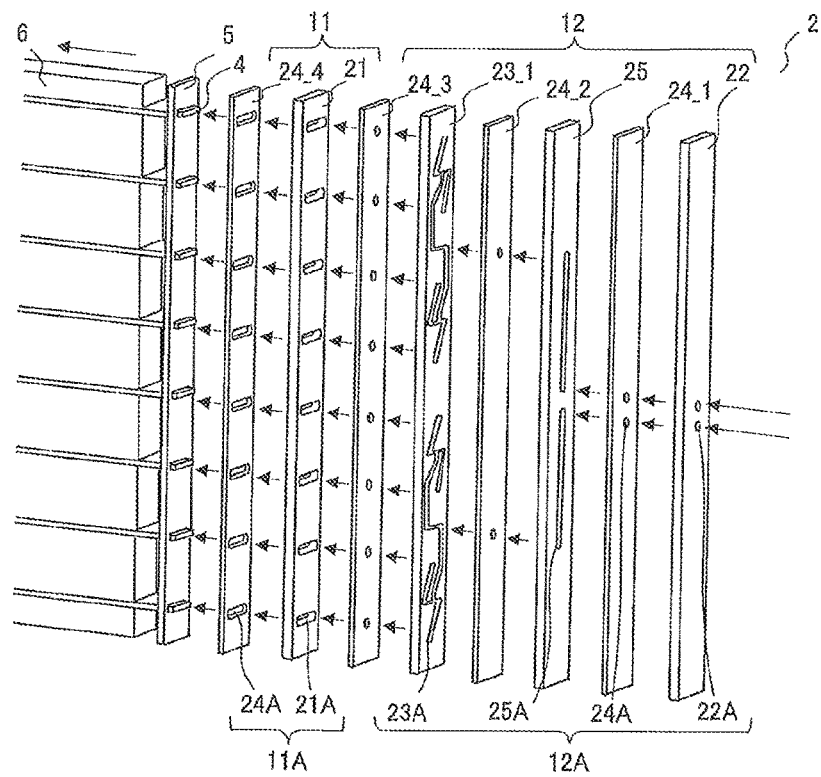
FIG. 15 is a perspective view of Modified Example-1 of the heat exchanger according to Embodiment 1 under a state in which the stacking-type header is disassembled.

FIG. 15 is a perspective view of Modified Example-1 of the heat exchanger according to Embodiment 1 under a state in which the stacking-type header is disassembled.

The plurality of flow passages 22A may not be formed in regions opposed to refrigerant inflow regions of the flow passages 23A formed in the third plate-shaped member 23.

As illustrated in FIG. 15, for example, the plurality of flow passages 22A may be formed collectively at one position, and a flow passage 25A of a different plate-shaped member 25 stacked between the second plate-shaped member 22 and the third plate-shaped member 23_1 may guide each of the flows of the refrigerant passing through the plurality of flow passages 22A to a region opposed to the refrigerant inflow region of the flow passage 23A formed in the third plate-shaped member 23.

Modified Example-2

Figure 16:
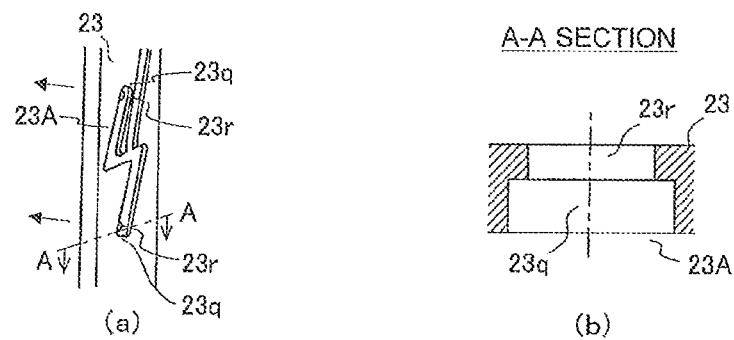
FIG. 16 are a main-part perspective view and a main-part sectional view of Modified Example-2 of the heat exchanger according to Embodiment 1 under a state in which the stacking-type header is disassembled.

FIG. 16 are a main-part perspective view and a main-part sectional view of Modified Example-2 of the heat exchanger according to Embodiment 1 under a state in which the stacking-type header is disassembled. Note that, FIG. 16($a$) is a main-part perspective view under the state in which the stacking-type header is disassembled, and FIG. 16($b$) is a sectional view of the third plate-shaped member 23 taken along the line A-A of FIG. 16($a$).

As illustrated in FIG. 16, the flow passage 23A formed in the third plate-shaped member 23 may be a bottomed groove. In such a case, a circular through hole 23$r$ is formed at an end portion 23$q$ of a bottom surface of the groove of the flow passage 23A. With such a configuration, the both-side clad member 24 is not required to be stacked between the plate-shaped members in order to interpose the flow passage 24A functioning as the refrigerant partitioning flow passage between the branching flow passages 12$b$, which improves the production efficiency. Note that, in FIG. 16, there is illustrated a case where the refrigerant outflow side of the flow passage 23A is the bottom surface, but the refrigerant inflow side of the flow passage 23A may be the bottom surface. In such a case, a through hole may be formed in a region corresponding to the opening port 23$i$.

Modified Example-3

Figure 17:
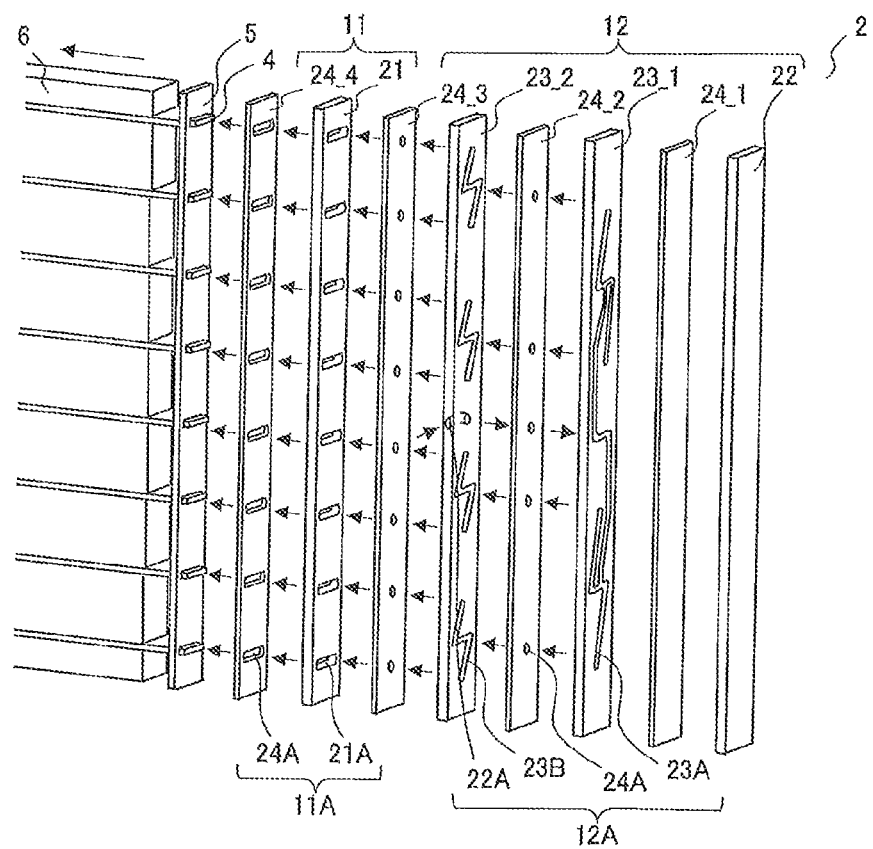
FIG. 17 is a perspective view of Modified Example-3 of the heat exchanger according to Embodiment 1 under a state in which the stacking-type header is disassembled.

FIG. 17 is a perspective view of Modified Example-3 of the heat exchanger according to Embodiment 1 under a state in which the stacking-type header is disassembled.

As illustrated in FIG. 17, the flow passage 22A functioning as the first inlet flow passage 12$a$ may be formed in a member to be stacked other than the second plate-shaped member 22, in other words, a different plate-shaped member, the both-side clad member 24, or other members. In such a case, the flow passage 22A may be formed as, for example, a through hole passing through the different plate-shaped member from the side surface thereof to the surface on the side on which the second plate-shaped member 22 is present. In other words, the present invention encompasses a configuration in which the first inlet flow passage 12$a$ is formed in the first plate-shaped unit 11, and the "distribution flow passage" of the present invention encompasses distribution flow passages other than the distribution flow passage 12A in which the first inlet flow passage 12$a$ is formed in the second plate-shaped unit 12.

Embodiment 2

A heat exchanger according to Embodiment 2 is described.

Note that, overlapping description or similar description to that of Embodiment 1 is appropriately simplified or omitted.

Configuration of Heat Exchanger

Now, the configuration of the heat exchanger according to Embodiment 2 is described.

Figure 18:
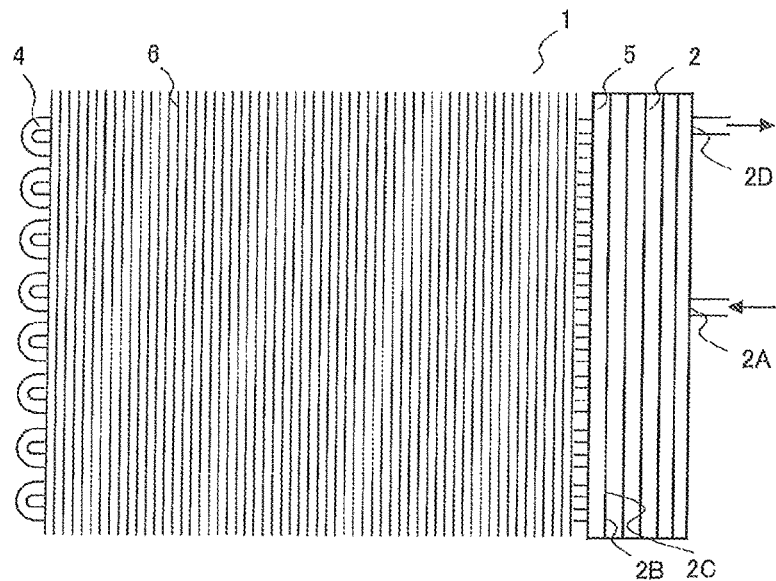
FIG. 18 is a view illustrating a configuration of a heat exchanger according to Embodiment 2.

FIG. 18 is a view illustrating the configuration of the heat exchanger according to Embodiment 2.

As illustrated in FIG. 18, the heat exchanger 1 includes the stacking-type header 2, the plurality of first heat transfer tubes 4, the retaining member 5, and the plurality of fins 6.

The stacking-type header 2 includes the refrigerant inflow port 2A, the plurality of refrigerant outflow ports 2B, a plurality of refrigerant inflow ports 2C, and a refrigerant outflow port 2D. The refrigerant pipes are connected to the refrigerant inflow port 2A of the stacking-type header 2 and the refrigerant outflow port 2D of the stacking-type header 2. The first heat transfer tube 4 is a flat tube subjected to hair-pin bending. The plurality of first heat transfer tubes 4 are connected between the plurality of refrigerant outflow ports 2B of the stacking-type header 2 and the plurality of refrigerant inflow ports 2C of the stacking-type header 2.

Flow of Refrigerant in Heat Exchanger

Now, the flow of the refrigerant in the heat exchanger according to Embodiment 2 is described.

The refrigerant flowing through the refrigerant pipe passes through the refrigerant inflow port 2A to flow into the stacking-type header 2 to be distributed, and then passes through the plurality of refrigerant outflow ports 2B to flow out toward the plurality of first heat transfer tubes 4. In the plurality of first heat transfer tubes 4, the refrigerant exchanges heat with air supplied by a fan, for example. The refrigerant passing through the plurality of first heat transfer tubes 4 passes through the plurality of refrigerant inflow ports 2C to flow into the stacking-type header 2 to be joined, and then passes through the refrigerant outflow port 2D to flow out toward the refrigerant pipe. The refrigerant can reversely flow.

Configuration of Laminated Header

Now, the configuration of the stacking-type header of the heat exchanger according to Embodiment 2 is described.

Figure 19:
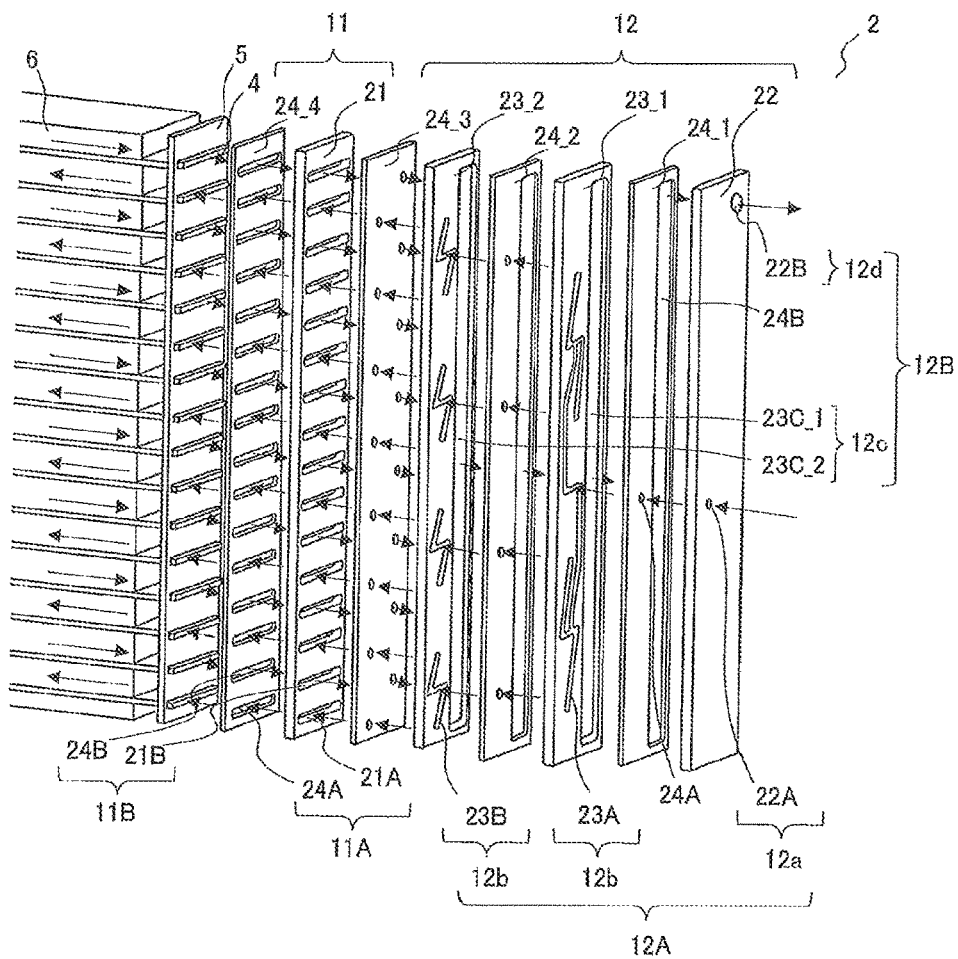
FIG. 19 is a perspective view illustrating the heat exchanger according to Embodiment 2 under a state in which a stacking-type header is disassembled.
Figure 20:
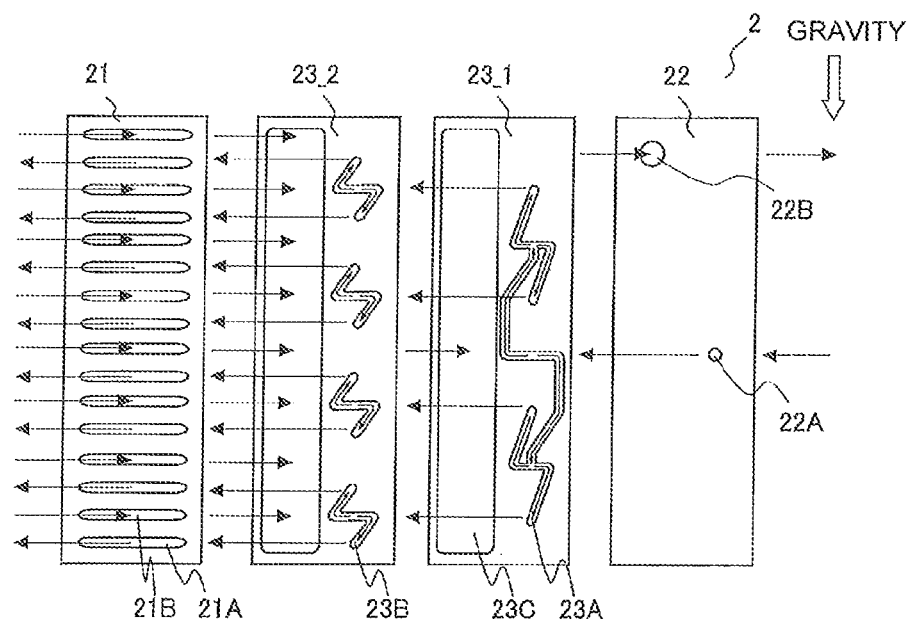
FIG. 20 is a developed view of the stacking-type header of the heat exchanger according to Embodiment 2.

FIG. 19 is a perspective view of the heat exchanger according to Embodiment 2 under a state in which the stacking-type header is disassembled. FIG. 20 is a developed view of the stacking-type header of the heat exchanger according to Embodiment 2. Note that, in FIG. 20, the illustration of the both-side clad member 24 is omitted.

As illustrated in FIG. 19 and FIG. 20, the stacking-type header 2 includes the first plate-shaped unit 11 and the second plate-shaped unit 12. The first plate-shaped unit 11 and the second plate-shaped unit 12 are stacked on each other.

The first plate-shaped unit 11 has the plurality of first outlet flow passages 11A and a plurality of second inlet flow passages 11B formed therein. The plurality of second inlet flow passages 11B correspond to the plurality of refrigerant inflow ports 2C in FIG. 18.

The first plate-shaped member 21 has a plurality of flow passages 21B formed therein. The plurality of flow passages 21B are each a through hole having an inner peripheral surface shaped conforming to an outer peripheral surface of the first heat transfer tube 4. When the first plate-shaped member 21 is stacked, the plurality of flow passages 21B function as the plurality of second inlet flow passages 11B.

The second plate-shaped unit 12 has the distribution flow passage 12A and a joining flow passage 12B formed therein. The joining flow passage 12B includes a mixing flow passage 12c and a second outlet flow passage 12d. The second outlet flow passage 12d corresponds to the refrigerant outflow port 2D in FIG. 18.

The second plate-shaped member 22 has a flow passage 22B formed therein. The flow passage 22B is a circular through hole. When the second plate-shaped member 22 is stacked, the flow passage 22B functions as the second outlet flow passage 12d. Note that, a plurality of flow passages 22B, in other words, a plurality of second outlet flow passages 12d may be formed.

The third plate-shaped members 23_1 and 23_2 respectively have flow passages 23C_1 and 23C_2 formed therein. The flow passages 23C_1 and 23C_2 are each a rectangular through hole passing through substantially the entire region in the height direction of the third plate-shaped member 23. When the third plate-shaped members 23_1 and 23_2 are stacked, each of the flow passages 23C_1 and 23C_2 functions as the mixing flow passage 12c. The flow passages 23C_1 and 23C_2 may not have a rectangular shape. In the following, in some cases, the plurality of flow passages 23C_1 and 23C_2 may be collectively referred to as the flow passage 23C.

In particular, it is preferred to stack the both-side clad member 24 having a brazing material rolled on both surfaces thereof between the respective plate-shaped members to supply the brazing material. The flow passage 24B formed in the both-side clad member 24_4 stacked between the retaining member 5 and the first plate-shaped member 21 is a through hole having an inner peripheral surface shaped conforming to the outer peripheral surface of the first heat transfer tube 4. The flow passage 24B formed in the both-side clad member 24_3 stacked between the first plate-shaped member 21 and the third plate-shaped member 23_2 is a circular through hole. The flow passage 24B formed in the both-side clad member 24 stacked between the third plate-shaped member 23_1 and the second plate-shaped member 22 is a rectangular through hole passing through substantially the entire region in the height direction of the both-side clad member 24. When the both-side clad member 24 is stacked, the flow passage 24B functions as the refrigerant partitioning flow passage for the second inlet flow passage 11B and the joining flow passage 12B.

Note that, the flow passage 22B functioning as the second outlet flow passage 12d may be formed in a different plate-shaped member other than the second plate-shaped member 22 of the second plate-shaped unit 12, the both-side clad member 24, or other members. In such a case, a notch may be formed, which communicates between a part of the flow passage 23C or the flow passage 24B and, for example, a side surface of the different plate-shaped member or the both-side clad member 24. The mixing flow passage 12c may be turned back so that the flow passage 22B functioning as the second outlet flow passage 12d is formed in the first plate-shaped member 21. In other words, the present invention encompasses a configuration in which the second outlet flow passage 12d is formed in the first plate-shaped unit 11, and the "joining flow passage" of the present invention encompasses joining flow passages other than the joining flow passage 12B in which the second outlet flow passage 12d is formed in the second plate-shaped unit 12.

Flow of Refrigerant in Laminated Header

Now, the flow of the refrigerant in the stacking-type header of the heat exchanger according to Embodiment 2 is described.

As illustrated in FIG. 19 and FIG. 20, the refrigerant flowing out from the flow passage 21A of the first plate-shaped member 21 to pass through the first heat transfer tube 4 flows into the flow passage 21B of the first plate-shaped member 21. The refrigerant flowing into the flow passage 21B of the first plate-shaped member 21 flows into the flow passage 23C formed in the third plate-shaped member 23 to be mixed. The mixed refrigerant passes through the flow passage 22B of the second plate-shaped member 22 to flow out therefrom toward the refrigerant pipe.

Usage Mode of Heat Exchanger

Now, an example of a usage mode of the heat exchanger according to Embodiment 2 is described.

Figure 21:
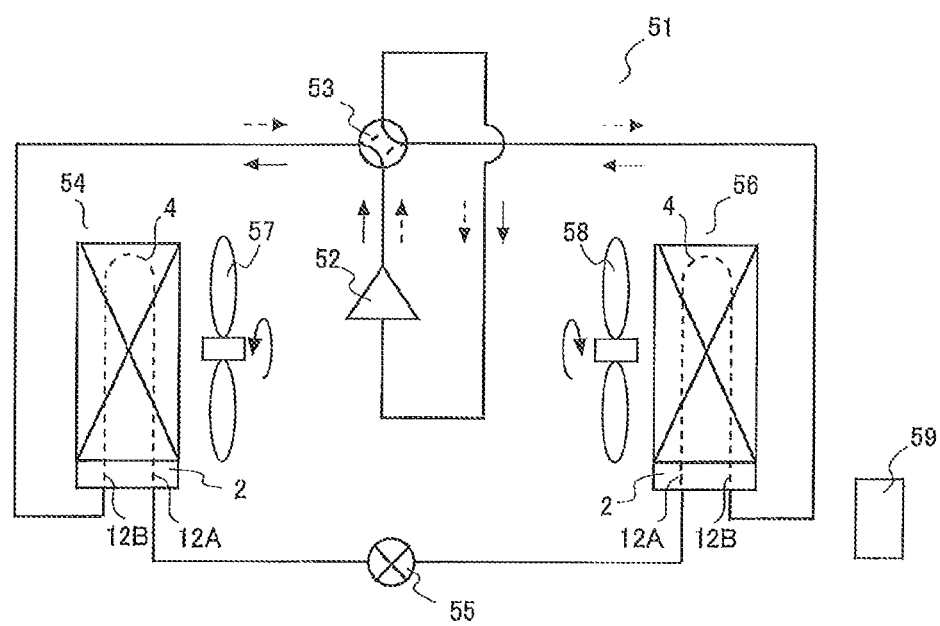
FIG. 21 is a diagram illustrating a configuration of an air-conditioning apparatus to which the heat exchanger according to Embodiment 2 is applied.

FIG. 21 is a diagram illustrating a configuration of an air-conditioning apparatus to which the heat exchanger according to Embodiment 2 is applied.

As illustrated in FIG. 21, the heat exchanger 1 is used for at least one of the heat source-side heat exchanger 54 or the load-side heat exchanger 56. When the heat exchanger 1 acts as the evaporator, the heat exchanger 1 is connected so that the refrigerant passes through the distribution flow passage 12A of the stacking-type header 2 to flow into the first heat transfer tube 4, and the refrigerant passes through the first heat transfer tube 4 to flow into the joining flow passage 12B of the stacking-type header 2. In other words, when the heat exchanger 1 acts as the evaporator, the refrigerant in a two-phase gas-liquid state passes through the refrigerant pipe to flow into the distribution flow passage 12A of the stacking-type header 2, and the refrigerant in a gas state passes through the first heat transfer tube 4 to flow into the joining flow passage 12B of the stacking-type header 2. Further, when the heat exchanger 1 acts as the condensor, the refrigerant in a gas state passes through the refrigerant pipe to flow into the joining flow passage 12B of the stacking-type header 2, and the refrigerant in a liquid state passes through the first heat transfer tube 4 to flow into the distribution flow passage 12A of the stacking-type header 2.

Action of Heat Exchanger

Now, the action of the heat exchanger according to Embodiment 2 is described.

In the stacking-type header 2, the first plate-shaped unit 11 has the plurality of second inlet flow passages 11B formed therein, and the second plate-shaped unit 12 has the joining flow passage 12B formed therein. Therefore, the header 3 is unnecessary, and thus the component cost and the like of the heat exchanger 1 are reduced. Further, the header 3 is unnecessary, and accordingly, it is possible to extend the first heat transfer tube 4 to increase the number of the fins 6 and the like, in other words, increase the mounting volume of the heat exchanging unit of the heat exchanger 1.

Embodiment 3

A heat exchanger according to Embodiment 3 is described.

Note that, overlapping description or similar description to that of each of Embodiment 1 and Embodiment 2 is appropriately simplified or omitted.

Configuration of Heat Exchanger

Now, the configuration of the heat exchanger according to Embodiment 3 is described.

Figure 22:
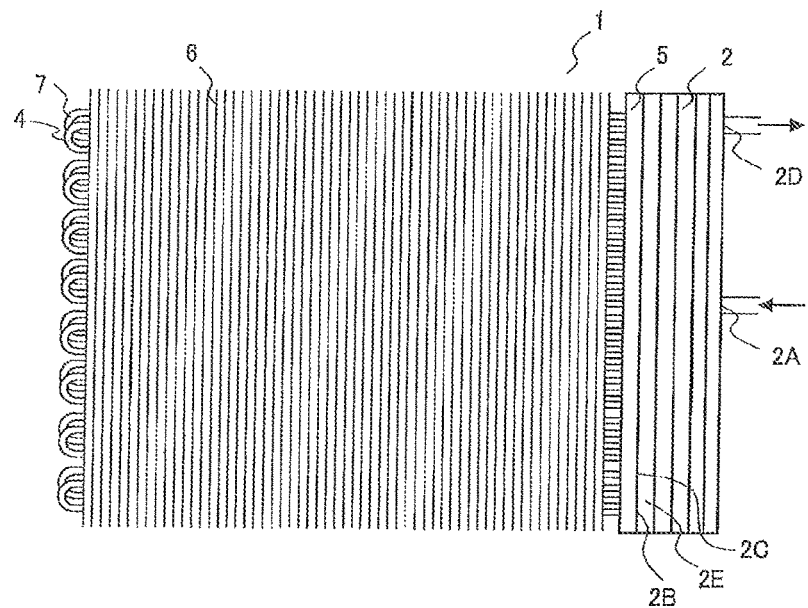
FIG. 22 is a view illustrating a configuration of a heat exchanger according to Embodiment 3.

FIG. 22 is a view illustrating the configuration of the heat exchanger according to Embodiment 3.

As illustrated in FIG. 22, the heat exchanger 1 includes the stacking-type header 2, the plurality of first heat transfer tubes 4, a plurality of second heat transfer tubes 7, the retaining member 5, and the plurality of fins 6.

The stacking-type header 2 includes a plurality of refrigerant turn-back ports 2E. Similarly to the first heat transfer tube 4, the second heat transfer tube 7 is a flat tube subjected to hair-pin bending. The plurality of first heat transfer tubes 4 are connected between the plurality of refrigerant outflow ports 2B and the plurality of refrigerant turn-back ports 2E of the stacking-type header 2, and the plurality of second heat transfer tubes 7 are connected between the plurality of refrigerant turn-back ports 2E and the plurality of refrigerant inflow ports 2C of the stacking-type header 2.

Flow of Refrigerant in Heat Exchanger

Now, the flow of the refrigerant in the heat exchanger according to Embodiment 3 is described.

The refrigerant flowing through the refrigerant pipe passes through the refrigerant inflow port 2A to flow into the stacking-type header 2 to be distributed, and then passes through the plurality of refrigerant outflow ports 2B to flow out toward the plurality of first heat transfer tubes 4. In the plurality of first heat transfer tubes 4, the refrigerant exchanges heat with air supplied by a fan, for example. The refrigerant passing through the plurality of first heat transfer tubes 4 flows into the plurality of refrigerant turn-back ports 2E of the stacking-type header 2 to be turned back, and flows out therefrom toward the plurality of second heat transfer tubes 7. In the plurality of second heat transfer tubes 7, the refrigerant exchanges heat with air supplied by a fan, for example. The flows of the refrigerant passing through the plurality of second heat transfer tubes 7 pass through the plurality of refrigerant inflow ports 2C to flow into the stacking-type header 2 to be joined, and the joined refrigerant passes through the refrigerant outflow port 2D to flow out therefrom toward the refrigerant pipe. The refrigerant can reversely flow.

Configuration of Laminated Header

Now, the configuration of the stacking-type header of the heat exchanger according to Embodiment 3 is described.

Figure 23:
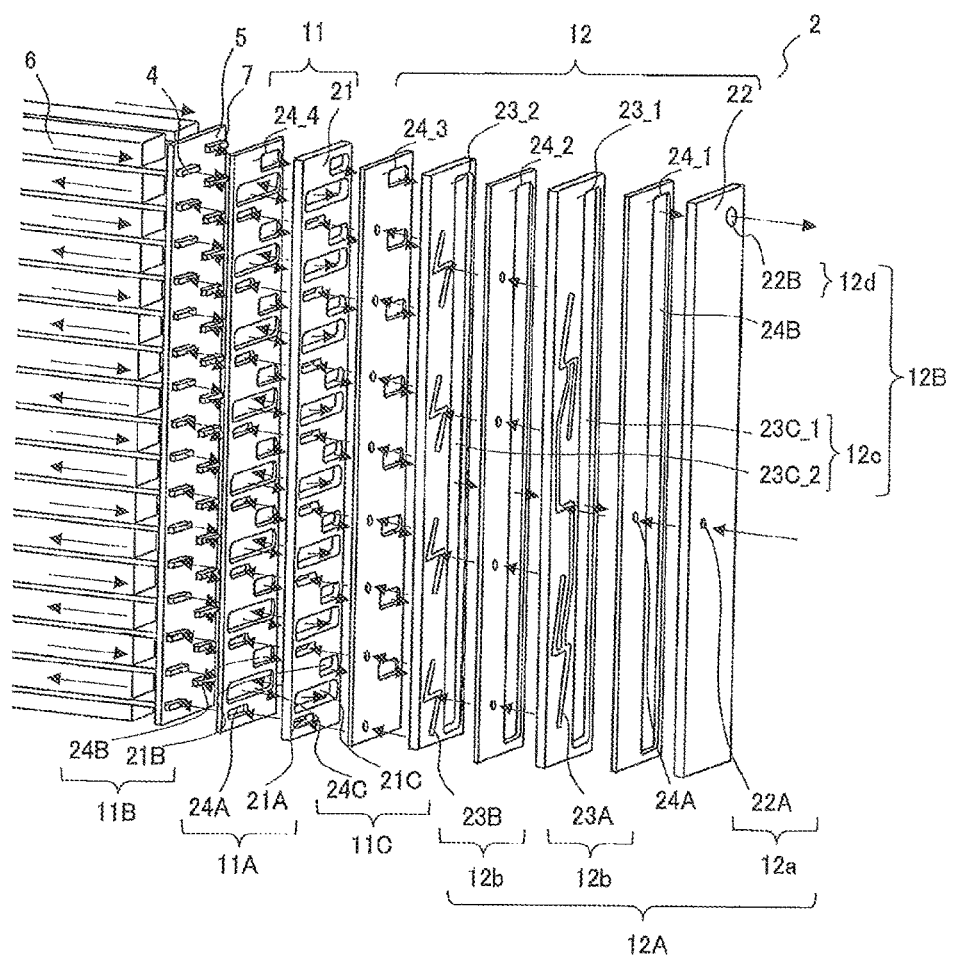
FIG. 23 is a perspective view illustrating the heat exchanger according to Embodiment 3 under a state in which a stacking-type header is disassembled.
Figure 24:
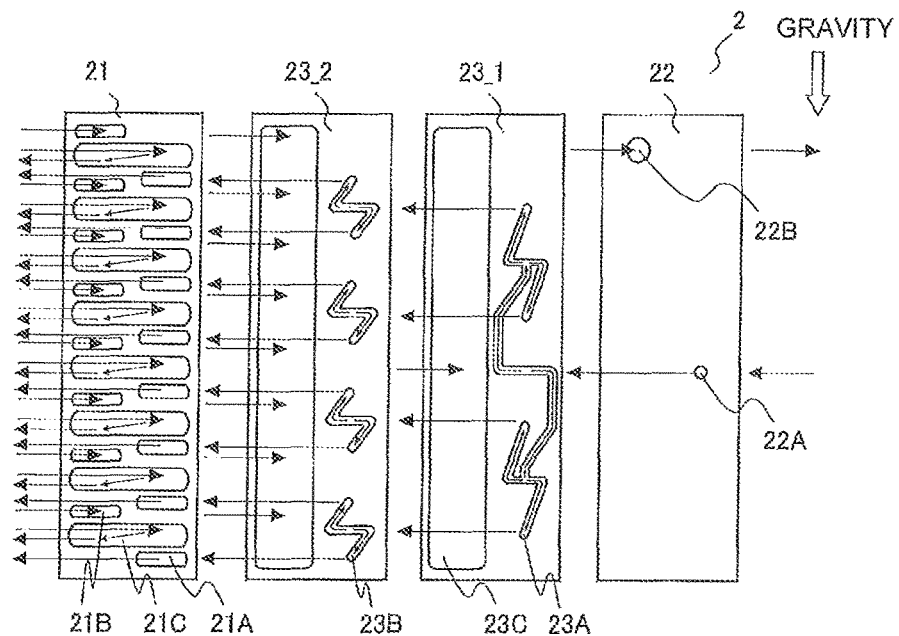
FIG. 24 is a developed view of the stacking-type header of the heat exchanger according to Embodiment 3.

FIG. 23 is a perspective view of the heat exchanger according to Embodiment 3 under a state in which the stacking-type header is disassembled. FIG. 24 is a developed view of the stacking-type header of the heat exchanger according to Embodiment 3. Note that, in FIG. 24, the illustration of the both-side clad member 24 is omitted.

As illustrated in FIG. 23 and FIG. 24, the stacking-type header 2 includes the first plate-shaped unit 11 and the second plate-shaped unit 12. The first plate-shaped unit 11 and the second plate-shaped unit 12 are stacked on each other.

The first plate-shaped unit 11 has the plurality of first outlet flow passages 11A, the plurality of second inlet flow passages 11B, and a plurality of turn-back flow passages 11C formed therein. The plurality of turn-back flow passages 11C correspond to the plurality of refrigerant turn-back ports 2E in FIG. 22.

The first plate-shaped member 21 has a plurality of flow passages 21C formed therein. The plurality of flow passages 21C are each a through hole having an inner peripheral surface shaped to surround the outer peripheral surface of the end portion of the first heat transfer tube 4 on the refrigerant outflow side and the outer peripheral surface of the end portion of the second heat transfer tube 7 on the refrigerant inflow side. When the first plate-shaped member 21 is stacked, the plurality of flow passages 21C function as the plurality of turn-back flow passages 11C.

In particular, it is preferred to stack the both-side clad member 24 having a brazing material rolled on both surfaces thereof between the respective plate-shaped members to supply the brazing material. The flow passage 24C formed in the both-side clad member 24_4 stacked between the retaining member 5 and the first plate-shaped member 21 is a through hole having an inner peripheral surface shaped to surround the outer peripheral surface of the end portion of the first heat transfer tube 4 on the refrigerant outflow side and the outer peripheral surface of the end portion of the second heat transfer tube 7 on the refrigerant inflow side. When the both-side clad member 24 is stacked, the flow passage 24C functions as the refrigerant partitioning flow passage for the turn-back flow passage 11C.

Flow of Refrigerant in Laminated Header

Now, the flow of the refrigerant in the stacking-type header of the heat exchanger according to Embodiment 3 is described.

As illustrated in FIG. 23 and FIG. 24, the refrigerant flowing out from the flow passage 21A of the first plate-shaped member 21 to pass through the first heat transfer tube 4 flows into the flow passage 21C of the first plate-shaped member 21 to be turned back and flow into the second heat transfer tube 7. The refrigerant passing through the second heat transfer tube 7 flows into the flow passage 21B of the first plate-shaped member 21. The refrigerant flowing into the flow passage 21B of the first plate-shaped member 21 flows into the flow passage 23C formed in the third plate-shaped member 23 to be mixed. The mixed refrigerant passes through the flow passage 22B of the second plate-shaped member 22 to flow out therefrom toward the refrigerant pipe.

Usage Mode of Heat Exchanger

Now, an example of a usage mode of the heat exchanger according to Embodiment 3 is described.

Figure 25:
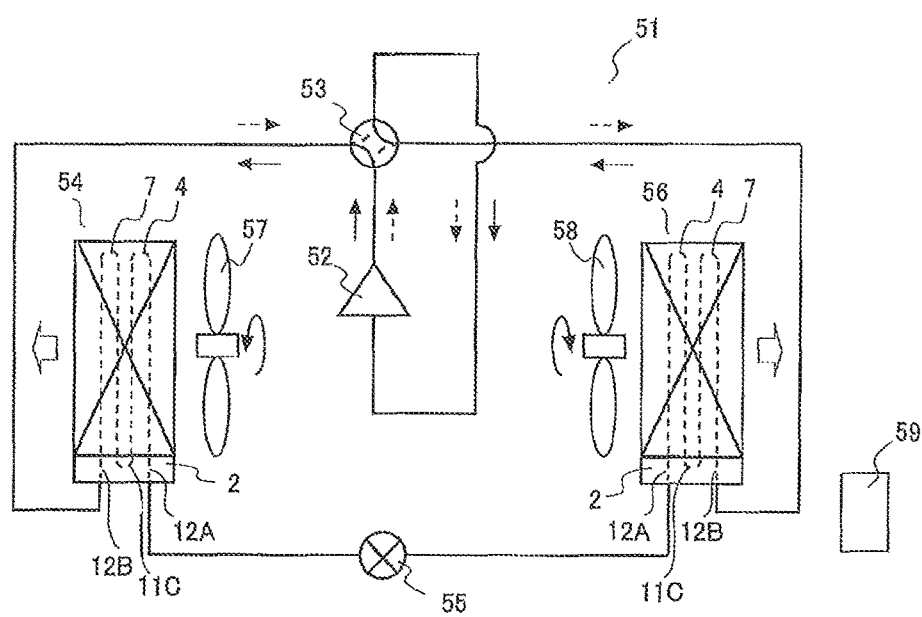
FIG. 25 is a diagram illustrating a configuration of an air-conditioning apparatus to which the heat exchanger according to Embodiment 3 is applied.

FIG. 25 is a diagram illustrating a configuration of an air-conditioning apparatus to which the heat exchanger according to Embodiment 3 is applied.

As illustrated in FIG. 25, the heat exchanger 1 is used for at least one of the heat source-side heat exchanger 54 or the load-side heat exchanger 56. When the heat exchanger 1 acts as the evaporator, the heat exchanger 1 is connected so that the refrigerant passes through the distribution flow passage 12A of the stacking-type header 2 to flow into the first heat transfer tube 4, and the refrigerant passes through the second heat transfer tube 7 to flow into the joining flow passage 12B of the stacking-type header 2. In other words, when the heat exchanger 1 acts as the evaporator, the refrigerant in a two-phase gas-liquid state passes through the refrigerant pipe to flow into the distribution flow passage 12A of the stacking-type header 2, and the refrigerant in a gas state passes through the second heat transfer tube 7 to flow into the joining flow passage 12B of the stacking-type header 2. Further, when the heat exchanger 1 acts as the condensor, the refrigerant in a gas state passes through the refrigerant pipe to flow into the joining flow passage 12B of the stacking-type header 2, and the refrigerant in a liquid state passes through the first heat transfer tube 4 to flow into the distribution flow passage 12A of the stacking-type header 2.

Further, when the heat exchanger 1 acts as the condensor, the heat exchanger 1 is arranged so that the first heat transfer tube 4 is positioned on the upstream side (windward side) of the air stream generated by the heat source-side fan 57 or the load-side fan 58 with respect to the second heat transfer tube 7. In other words, there is obtained a relationship that the flow of the refrigerant from the second heat transfer tube 7 to the first heat transfer tube 4 and the air stream are opposed to each other. The refrigerant of the first heat transfer tube 4 is lower in temperature than the refrigerant of the second heat transfer tube 7. The air stream generated by the heat source-side fan 57 or the load-side fan 58 is lower in temperature on the upstream side of the heat exchanger 1 than on the downstream side of the heat exchanger 1. As a result, in particular, the refrigerant can be subcooled (so-called subcooling) by the low-temperature air stream flowing on the upstream side of the heat exchanger 1, which improves the condensor performance. Note that, the heat source-side fan 57 and the load-side fan 58 may be arranged on the windward side or the leeward side.

Action of Heat Exchanger

Now, the action of the heat exchanger according to Embodiment 3 is described.

In the heat exchanger 1, the first plate-shaped unit 11 has the plurality of turn-back flow passages 11C formed therein, and in addition to the plurality of first heat transfer tubes 4, the plurality of second heat transfer tubes 7 are connected. For example, it is possible to increase the area in a state of the front view of the heat exchanger 1 to increase the heat exchange amount, but in this case, the housing that incorporates the heat exchanger 1 is upsized. Further, it is possible to decrease the interval between the fins 6 to increase the number of the fins 6, to thereby increase the heat exchange amount. In this case, however, from the viewpoint of drainage performance, frost formation performance, and anti-dust performance, it is difficult to decrease the interval between the fins 6 to less than about 1 mm, and thus the increase in heat exchange amount may be insufficient. On the other hand, when the number of rows of the heat transfer tubes is increased as in the heat exchanger 1, the heat exchange amount can be increased without changing the area in the state of the front view of the heat exchanger 1, the interval between the fins 6, or other matters. When the number of rows of the heat transfer tubes is two, the heat exchange amount is increased about 1.5 times or more. Note that, the number of rows of the heat transfer tubes may be three or more. Still further, the area in the state of the front view of the heat exchanger 1, the interval between the fins 6, or other matters may be changed.

Further, the header (stacking-type header 2) is arranged only on one side of the heat exchanger 1. For example, when the heat exchanger 1 is arranged in a bent state along a plurality of side surfaces of the housing incorporating the heat exchanger 1 in order to increase the mounting volume of the heat exchanging unit, the end portion may be misaligned in each row of the heat transfer tubes because the curvature radius of the bent part differs depending on each row of the heat transfer tubes. When, as in the stacking-type header 2, the header (stacking-type header 2) is arranged only on one side of the heat exchanger 1, even when the end portion is misaligned in each row of the heat transfer tubes, only the end portions on one side are required to be aligned, which improves the degree of freedom in design, the production efficiency, and other matters as compared to the case where the headers (stacking-type header 2 and header 3) are arranged on both sides of the heat exchanger 1 as in the heat exchanger according to Embodiment 1. In particular, the heat exchanger 1 can be bent after the respective members of the heat exchanger 1 are joined to each other, which further improves the production efficiency.

Further, when the heat exchanger 1 acts as the condenser, the first heat transfer tube 4 is positioned on the windward side with respect to the second heat transfer tube 7. When the headers (stacking-type header 2 and header 3) are arranged on both sides of the heat exchanger 1 as in the heat exchanger according to Embodiment 1, it is difficult to provide a temperature difference in the refrigerant for each row of the heat transfer tubes to improve the condenser performance. In particular, when the first heat transfer tube 4 and the second heat transfer tube 7 are flat tubes, unlike a circular tube, the degree of freedom in bending is low, and hence it is difficult to realize providing the temperature difference in the refrigerant for each row of the heat transfer tubes by deforming the flow passage of the refrigerant. On the other hand, when the first heat transfer tube 4 and the second heat transfer tube 7 are connected to the stacking-type header 2 as in the heat exchanger 1, the temperature difference in the refrigerant is inevitably generated for each row of the heat transfer tubes, and obtaining the relationship that the refrigerant flow and the air stream are opposed to each other can be easily realized without deforming the flow passage of the refrigerant.

The present invention has been described above with reference to Embodiment 1 to Embodiment 3, but the present invention is not limited to those embodiments. For example, a part or all of the respective embodiments, the respective modified examples, and the like may be combined.

REFERENCE SIGNS LIST 1 heat exchanger 2 stacking-type header 2A refrigerant inflow port 2B refrigerant outflow port 2C refrigerant inflow port 2D refrigerant outflow port 2E refrigerant turn-back port 3 header 3A refrigerant inflow port 3B refrigerant outflow port 4 first heat transfer tube 5 retaining member 6 fin 7 second heat transfer tube 11 first plate-shaped unit 11A first outlet flow passage 11B second inlet flow passage 11C turn-back flow passage 12 second plate-shaped unit 12A distribution flow passage 12B joining flow passage 12*a* first inlet flow passage 12*b* branching flow passage 12*c* mixing flow passage 12*d* second outlet flow passage 21 first plate-shaped member 21A-21C flow passage 22 second plate-shaped member 22A, 22B flow passage 23, 23_1, 23_2 third plate-shaped member 23A to 23C, 23C_1, 23C_2 flow passage 23*a* to 23*d* end portion of through groove 23*e* straight-line part 23*f* branching portion 23*g*, 23*h* end portion of straight-line part 23*i* opening port 23*j* to 23*l* branch part 23*m* center of branching portion 23*n* to 23*p* straight-line part 23*q* end portion of bottomed groove 23*r* through hole 24, 24_1 to 24_4 both-side clad member 24A to 24C flow passage 25 plate-shaped member 25A flow passage 51 air-conditioning apparatus 52 compressor 53 four-way valve 54 heat source-side heat exchanger 55 expansion device 56 load-side heat exchanger 57 heat source-side fan 58 load-side fan 59 controller

The invention claimed is:

1. A stacking-type header, comprising:
a first plate-shaped unit having a plurality of first outlet flow passages formed therein; and
a second plate-shaped unit being mounted on the first plate-shaped unit and having a first inlet flow passage formed therein and a distribution flow passage formed therein, the distribution flow passage being configured to distribute refrigerant, which passes through the first inlet flow passage to flow into the second plate-shaped unit, to the plurality of first outlet flow passages to cause the refrigerant to flow out from the second plate-shaped unit,
wherein the distribution flow passage comprises at least one branching flow passage,
wherein the second plate-shaped unit comprises at least one plate-shaped member having a groove formed as a flow passage, the groove having at least one branching portion for branching one branch part into two branch parts,
wherein the one branch part extends straight,
wherein the two branch parts extend straight in directions opposite to each other and perpendicular to a straight line part of the one branch part,
wherein the at least one branching flow passage is formed by closing a region in the groove other than a refrigerant inflow region and a refrigerant outflow region,
wherein at least part of the refrigerant flowing into the at least one branching flow passage first passes through the one branch part and then branches at the two branch parts into a first flow, which passes through a first one of the two branch parts, and a second flow, which passes through a second one of the two branch parts,
wherein the first flow and the second flow each flow out into mutually different flow passages of the plurality of first outlet flow passages,
wherein the straight line part of the one branch part is parallel to a gravity direction,
wherein the first plate-shaped unit has a plurality of second inlet flow passages formed therein, and
wherein the second plate-shaped unit has a joining flow passage formed therein, the joining flow passage being configured to join together flows of the refrigerant, which pass through the plurality of second inlet flow passages to flow into the second plate-shaped unit, to cause the refrigerant to flow into a second outlet flow passage.

2. The stacking-type header of claim 1, wherein a distance of the one branch part extending straight is three times or more as large as a hydraulic equivalent diameter of the one branch part.

3. The stacking-type header of claim 1, wherein a distance of each of the two branch parts extending straight is one time or more as large as a hydraulic equivalent diameter of the each of the two branch parts.

4. The stacking-type header of claim 1, wherein an array direction of the end portions of the groove is directed along an array direction of the plurality of first outlet flow passages.

5. The stacking-type header of claim 4, wherein the array direction of the plurality of first outlet flow passages intersects with the gravity direction.

6. The stacking-type header of claim 1, wherein the groove comprises a plurality of grooves.

7. The stacking-type header of claim 1, wherein the first plate-shaped unit has a plurality of turn-back flow passages formed therein, the plurality of turn-back flow passages being configured to turn back the refrigerant flowing into the first plate-shaped unit to cause the refrigerant to flow out from the first plate-shaped unit.

8. The stacking-type header of claim 1, wherein the at least part of the refrigerant branched by flowing into the at least one branching flow passage flows into the one branch part.

9. A heat exchanger, comprising a stacking-type header, wherein the stacking-type header comprises:
   a first plate-shaped unit having a plurality of first outlet flow passages formed therein; and
   a second plate-shaped unit being mounted on the first plate-shaped unit and having a first inlet flow passage formed therein and a distribution flow passage formed therein, the distribution flow passage being configured to distribute refrigerant, which passes through the first inlet flow passage to flow into the second plate-shaped unit, to the plurality of first outlet flow passages to cause the refrigerant to flow out from the second plate-shaped unit,
   wherein the distribution flow passage comprises at least one branching flow passage,
   wherein the second plate-shaped unit comprises at least one plate-shaped member having a groove formed as a flow passage, the groove having at least one branching portion for branching one branch part into two branch parts,
   wherein the one branch part extends straight,
   wherein the two branch parts extend straight in directions opposite to each other and perpendicular to a straight line part of the one branch part,
   wherein the at least one branching flow passage is formed by closing a region in the groove other than a refrigerant inflow region and a refrigerant outflow region,
   wherein at least part of the refrigerant flowing into the at least one branching flow passage first passes through the one branch part and then branches at the two branch parts into a first flow, which passes through a first one of the two branch parts, and a second flow, which passes through a second one of the two branch parts,
   wherein the first flow and the second flow each flow out into mutually different flow passages of the plurality of first outlet flow passages,
   wherein the straight line part of the one branch part is parallel to a gravity direction, and
   wherein the heat exchanger further comprises a plurality of first heat transfer tubes connected to the plurality of first outlet flow passages, respectively,
   wherein the first plate-shaped unit has a plurality of second inlet flow passages formed therein, into which the refrigerant passing through the plurality of first heat transfer tubes flows, and
   wherein the second plate-shaped unit has a joining flow passage formed therein, the joining flow passage being configured to join together flows of the refrigerant, which pass through the plurality of second inlet flow passages to flow into the second plate-shaped unit, to cause the refrigerant to flow into a second outlet flow passage.

10. The heat exchanger of claim 9, wherein the first heat transfer tubes each comprise a flat tube.

11. An air-conditioning apparatus, comprising the heat exchanger of claim 9, wherein the distribution flow passage is configured to cause the refrigerant to flow out from the distribution flow passage toward the plurality of first outlet flow passages when the heat exchanger acts as an evaporator.

12. An air-conditioning apparatus, comprising a heat exchanger, wherein the heat exchanger comprises a stacking-type header, and wherein the stacking-type header comprises:
   a first plate-shaped unit having a plurality of first outlet flow passages formed therein; and
   a second plate-shaped unit being mounted on the first plate-shaped unit and having a first inlet flow passage formed therein and a distribution flow passage formed therein, the distribution flow passage being configured to distribute refrigerant, which passes through the first inlet flow passage to flow into the second plate-shaped unit, to the plurality of first outlet flow passages to cause the refrigerant to flow out from the second plate-shaped unit,
   wherein the distribution flow passage comprises at least one branching flow passage,
   wherein the second plate-shaped unit comprises at least one plate-shaped member having a groove formed as a flow passage, the groove having at least one branching portion for branching one branch part into two branch parts,
   wherein the one branch part extends straight,
   wherein the two branch parts extend straight in directions opposite to each other and perpendicular to a straight line part of the one branch part,
   wherein the at least one branching flow passage is formed by closing a region in the groove other than a refrigerant inflow region and a refrigerant outflow region,
   wherein at least part of the refrigerant flowing into the at least one branching flow passage first passes through the one branch part and then branches at the two branch parts into a first flow, which passes through a first one of the two branch parts, and a second flow, which passes through a second one of the two branch parts,
   wherein the first flow and the second flow each flow out into mutually different flow passages of the plurality of first outlet flow passages,
   wherein the straight line part of the one branch part is parallel to a gravity direction,
   wherein the air-conditioning apparatus further comprises a plurality of first heat transfer tubes connected to the plurality of first outlet flow passages, respectively,
   wherein the first plate-shaped unit of the stacking-type header has a plurality of second inlet flow passages formed therein, into which the refrigerant passing through the plurality of first heat transfer tubes flows,
   wherein the second plate-shaped unit of the stacking-type header has a joining flow passage formed therein, the joining flow passage being configured to join together flows of the refrigerant, which pass through the plurality of second inlet flow passages to flow into the second plate-shaped unit, to cause the refrigerant to flow into a second outlet flow passage,
   wherein the heat exchanger further comprises a plurality of second heat transfer tubes connected to the plurality of second inlet flow passages, respectively,
   wherein the distribution flow passage is configured to cause the refrigerant to flow out from the distribution flow passage toward the plurality of first outlet flow passages when the heat exchanger acts as an evaporator, and
   wherein the plurality of first heat transfer tubes are positioned on a windward side with respect to the plurality of second heat transfer tubes when the heat exchanger acts as a condenser.

* * * * *